(12) United States Patent
Niewczas et al.

(10) Patent No.: US 12,432,098 B2
(45) Date of Patent: *Sep. 30, 2025

(54) SECURE ULTRA WIDE BAND RANGING

(71) Applicant: Decawave Ltd, Dublin (IE)

(72) Inventors: Jaroslaw Niewczas, Jozefow (PL); Dries Neirynck, Chelmsford (GB); Ciaran McElroy, Dublin (IE); Michael McLaughlin, Dublin (IE); Igor Dotlic, Dublin (IE); Marcas O'Duinn, Dublin (IE)

(73) Assignee: DecaWave Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,570

(22) Filed: Apr. 26, 2024

(65) Prior Publication Data
US 2024/0314000 A1 Sep. 19, 2024

Related U.S. Application Data

(63) Continuation of application No. 17/618,564, filed as application No. PCT/EP2020/066141 on Jun. 10, 2020, now Pat. No. 12,095,594.

(30) Foreign Application Priority Data

Jun. 13, 2019 (GB) .................................. 1908534
Jul. 29, 2019 (GB) .................................. 1910816

(51) Int. Cl.
H04L 25/02 (2006.01)
H04B 1/69 (2011.01)
(Continued)

(52) U.S. Cl.
CPC ............ H04L 25/0224 (2013.01); H04B 1/69 (2013.01); H04L 25/0212 (2013.01); H04W 12/03 (2021.01); H04W 12/122 (2021.01)

(58) Field of Classification Search
CPC .......... H04L 25/0224; H04L 25/0212; H04W 12/03; H04W 12/122; H04B 1/69
See application file for complete search history.

(56) References Cited

U.S. PATENT DOCUMENTS 4,145,569 A * 3/1979 Ehrat ..................... G09C 1/00
380/47
6,167,258 A * 12/2000 Schmidt ................ G08B 25/10
455/418

(Continued)

FOREIGN PATENT DOCUMENTS

CN 103457887 A 12/2013
CN 105763492 A 7/2016
(Continued)

OTHER PUBLICATIONS

Combined Search and Examination Report for U.K. Patent Application No. 1910816.6, mailed Jan. 28, 2020, 8 pages.
(Continued)

Primary Examiner — Jaison Joseph
(74) Attorney, Agent, or Firm — Withrow & Terranova, P.L.L.C.

(57) ABSTRACT

A method for use in a wireless communication system comprising a transmitter and a receiver, the method comprising receiving, in the receiver, data comprising a plurality of channel-distorted synchronization codes and plurality of channel-distorted cipher codes, generating a receiver cipher sequence, the receiver cipher sequence comprising a plurality of receiver cipher codes, analyzing the received data to identify correlations between the plurality of channel-distorted cipher codes in the received data and the plurality of receiver cipher codes, accumulating the identified correlations as accumulator data in an accumulator, identifying one or more peaks in the accumulator data, identifying a first correlation peak in the accumulator data that meets one or
(Continued)

| SYNC | SFD | CIPHER | PHR | DATA | more criteria and using the first correlation peak to identify the first path of a data packet from the transmitter.

39 Claims, 9 Drawing Sheets

(51) Int. Cl.
*H04W 12/03* (2021.01)
*H04W 12/122* (2021.01)

(56) References Cited

U.S. PATENT DOCUMENTS

| | | | | |
|---|---|---|---|---|
| 6,650,616 | B2* | 11/2003 | Crawford | H04L 63/0428 |
| | | | | 455/410 |
| 6,803,851 | B1 | 10/2004 | Kramer et al. | |
| 7,352,704 | B1* | 4/2008 | Toussi | H04B 1/7113 |
| | | | | 375/E1.018 |
| 7,636,397 | B2 | 12/2009 | McLaughlin | |
| 7,752,430 | B2* | 7/2010 | Dzung | H04L 27/2626 |
| | | | | 713/151 |
| 7,787,544 | B2 | 8/2010 | McLaughlin | |
| 8,358,709 | B2 | 1/2013 | McLaughlin | |
| 8,436,758 | B2 | 5/2013 | McLaughlin et al. | |
| 8,437,432 | B2 | 5/2013 | McLaughlin et al. | |
| 8,645,678 | B2* | 2/2014 | Al-Dweik | H04L 9/001 |
| | | | | 713/150 |
| 8,677,224 | B2 | 3/2014 | McLaughlin et al. | |
| 8,760,334 | B2 | 6/2014 | McLaughlin et al. | |
| 9,054,790 | B2* | 6/2015 | McLaughlin | H04B 1/719 |
| 9,325,338 | B2 | 4/2016 | McLaughlin et al. | |
| 2001/0009562 | A1 | 7/2001 | Ohno | |
| 2004/0145478 | A1* | 7/2004 | Frederick | G08B 13/2482 |
| | | | | 340/572.4 |
| 2004/0228268 | A1 | 11/2004 | McDonough et al. | |
| 2007/0058700 | A1 | 3/2007 | Fenton | |
| 2009/0135799 | A1 | 5/2009 | McPherson et al. | |
| 2015/0016488 | A1* | 1/2015 | McLaughlin | H04B 1/7183 |
| | | | | 375/130 |
| 2017/0359134 | A1* | 12/2017 | Baier | H04L 25/0224 |
| 2018/0007078 | A1 | 1/2018 | Motos et al. | |
| 2018/0069566 | A1* | 3/2018 | Soundararajan | H03K 5/2481 |
| 2018/0138993 | A1* | 5/2018 | Küchler | H04L 25/0202 |
| 2018/0254870 | A1* | 9/2018 | Dutz | H04L 5/0051 |
| 2018/0254923 | A1* | 9/2018 | Dutz | H04L 27/2662 |
| 2021/0084499 | A1* | 3/2021 | Kuchler | H04L 25/0224 |
| 2022/0200656 | A1* | 6/2022 | Subraveti | G01S 13/765 |
| 2022/0239532 | A1* | 7/2022 | Niewczas | H04L 25/0224 |
| 2024/0314000 | A1* | 9/2024 | Niewczas | H04L 25/0224 |

FOREIGN PATENT DOCUMENTS

| | | |
|---|---|---|
| EP | 1164710 A1 | 12/2001 |
| WO | 2017134310 A1 | 8/2017 |

OTHER PUBLICATIONS

Search Report for U.K. Patent Application No. 2113575.1, dated Feb. 22, 2022, 1 page.
International Search Report and Written Opinion for International Patent Application No. PCT/EP2020/066141, mailed Aug. 25, 2020, 15 pages.
IEEE, "IEEE Standard for Low-Rate Wireless Networks—Corrigendum 1: Correction of Errors Preventing Backward Compatibility," IEEE Std 802.15.4™-2020/Cor Jan. 2022, Jan. 2023, The Institute of Electrical and Electronics Engineers, Inc., 22 pages.
Karapistoli, E. et al., "An Overview of the IEEE 802.15.4a Standard," IEEE Communications Magazine, Jan. 2010, IEEE, pp. 47-53.
Non-Final Office Action for U.S. Appl. No. 17/618,564, mailed Sep. 25, 2023, 9 pages.
Notice of Allowance or U.S. Appl. No. 17/618,564, mailed Jan. 24, 2024, 10 pages.
Notice of Allowance or U.S. Appl. No. 17/618,564, mailed May 30, 2024, 10 pages.
First Office Action for Chinese Patent Application No. 202080057144.4, mailed Jun. 7, 2023, 11 pages.
Combined Search and Examination Report for U.K. Patent Application No. 2113575.1, mailed Feb. 23, 2022, 6 pages.

* cited by examiner

SECURE ULTRA WIDE BAND RANGING

RELATED APPLICATIONS

This application is a continuation of U.S. patent application Ser. No. 17/618,564, filed Dec. 13, 2021, now U.S. Pat. No. 12,095,594, which is a 35 USC 371 national phase filing of International Application No. PCT/EP2020/066141, filed Jun. 10, 2020, which claims priority to G.B. Patent Application No. 1910816.6, filed Jul. 29, 2019, and claims priority to G.B. Patent Application No. 1908534.9, filed Jun. 13, 2019, the disclosures of which are incorporated herein in their entireties.

FIELD OF THE DISCLOSURE

The present invention relates generally to wireless communication systems, and, in particular, to a wireless communication system adapted to perform secure ultra-wideband (UWB) channel sounding and ranging.

BACKGROUND

By way of example, in an ultra-wideband (UWB) communication system, a series of special processing steps are performed by a UWB transmitter to prepare payload data for transmission via a packet-based UWB channel. Upon reception, a corresponding series of reversing steps are performed by a UWB receiver to recover the data payload and compute the range. Details of both series of processing steps are fully described in IEEE Standards 802.15.4 (hereinafter, "802.15.4") and 802.15.4a (hereinafter, "802.15.4a"), which are expressly incorporated herein in their entirety by reference. As is known, these standards describe required functions of both the transmit and receive portions of the system, but specify implementation details only of the transmit portion of the system, leaving the choice to implementers of how to implement the receive portion.

Disclosed herein are certain improvements for use in UWB communication systems. These improvements are fully described in the following pending applications or issued patents, all of which are expressly incorporated herein in their entirety:

"A Method and Apparatus for Transmitting and Receiving Convolutionally Coded Data," U.S. Pat. No. 7,636,397, issued 22 Dec. 2009;
"Method and Apparatus for Generating Codewords," U.S. Pat. No. 7,787,544, issued 31 Jul. 2010;
"Method and Apparatus for Transmitting and Receiving Convolutionally Coded Data," U.S. Pat. No. 8,358,709, issued 22 Jan. 2013;
"Receiver for Use in an Ultra-Wideband Communication System," U.S. Pat. No. 8,437,432, issued 7 May 2013;
"Convolution Code for Use in a Communication System," U.S. Pat. No. 8,677,224, issued 18 Mar. 2014;
"Adaptive Ternary A/D Converter for Use in an Ultra-Wideband Communication System," U.S. Pat. No. 8,436,758, issued 7 May 2013;
"Receiver for Use in an Ultra-Wideband Communication System," U.S. Pat. No. 8,760,334, issued 24 Jun. 2014;
"Receiver for Use in an Ultra-Wideband Communication System," U.S. Pat. No. 9,054,790, issued 9 Jun. 2015;
"Adaptive Ternary A/D Converter for Use in an Ultra-Wideband Communication System," U.S. Pat. No. 9,325,338, issued 26 Apr. 2016; and
"Secure Channel Sounding," International Application No. PCT/EP2017/052564, filed 6 Feb. 2017, and published as WO 2017/134310 on 10 Aug. 2017.

SUMMARY

Aspects of the invention are set out in the independent claims and preferable features are set out in the dependent claims.

A method is described herein for use in a wireless communication system comprising a transmitter and a receiver, the method comprising: receiving, in the receiver, data, the data comprising of a plurality of channel-distorted cipher codes; generating a receiver cipher sequence at the receiver, the receiver cipher sequence comprising a plurality of receiver cipher codes; analyzing the received data to identify correlations between the plurality of channel-distorted cipher codes in the received data and the plurality of receiver cipher codes; accumulating the identified correlations as accumulator data in an accumulator; identifying one or more peaks in the accumulator data; identifying a first correlation peak in the accumulator data that meets one or more criteria; and using the first correlation peak to identify the first path of a data packet from the transmitter.

The ultimate goal of this method is to calculate a time-of-arrival (TOA), which may later be used to compute time-of-flight and even later, the distance between a receiver and a transmitter. In order to do this, it is necessary to identify the correlation peak which relates to the first (or most direct) path of a packet between the transmitter and the receiver (e.g., later peaks may be indicative of receiving the same packet, however the packet may be reflected off one or more surfaces, taking the packet longer to reach the receiver). There may, however, be several peaks, which may be identified as the first peak. For example, if a malicious attack creates peaks in the accumulator data or if there is a lot of noise in the accumulator data, there may be several peaks. Therefore, one of the one or more peaks in the accumulator data is identified or selected as being indicative of the first path only if it meets one or more criteria. In other words, the identified one or more peaks in the accumulator data are candidate first path peaks. There may be more than one criterion for accepting the peak to calculate the time of flight, and, in these cases, more than one of the criterion (in most cases, all of the criterion) must be met. Sometimes, these criterion are referred to as the final criteria for accepting a peak as the first correlation peak for the time of flight calculation.

Of course, the transmitter and the receiver may be devices that are each capable of both transmitting and receiving. In some scenarios, the transmitter is capable of transmitting and also of receiving, whilst the receiver can only receive (but not transmit) the messages or packets.

Preferably, the method is a ranging method and/or the wireless communication system is an ultra-wideband (UWB) network.

Preferably, the accumulator is part of the receiver.

The received data may comprise a data packet transmitted from the transmitter that has been distorted over the receiving channel.

The first correlation peak is generally the temporally earliest correlation peak that meets the one or more criteria.

The first path is generally the first path of a data signal or data packet from the transmitter to reach the receiver. In wireless communications, there may be several paths a wireless signal can take between the transmitter and the receiver due to scattering, reflection, or refraction of the signal. For example, the direct path (or "line of sight" path) will be the shortest path (e.g., a straight line) and so the data signal that reaches the transmitter first (referred to as the "first path") will generally have taken the direct path to reach the receiver. Identifying the data signal that has taken the direct path as well as identifying when it arrives at the receiver is useful since this can provide accurate information about the distance and/or direction from the receiver to the transmitter. Indirect paths (which can occur when the data signal is reflected or refracted between the transmitter and the receiver) will reach the receiver later than the data signal that has taken the first path (or direct path) since it will have travelled a longer distance.

The received data is preferably in the form of a plurality of pulses.

The method may further comprise receiving, in the receiver, data comprising of a plurality of channel-distorted synchronization codes. The channel-distorted synchronization codes may be used for channel sounding, which may improve the receipt of the data packets.

The method may comprise executing one or more diagnostic tests to verify that, during the reception(or receipt) of the data, the receiver performance and parameters are within expected limits. Identified peaks in the accumulator data may be rejected if certain diagnostic checks fail. For example, the criteria could include passing the diagnostic tests during receipt of the data.

Receiving the data, or receiving the data packet, at the receiver is generally over a wireless communication protocol, such as UWB communication.

The expected cipher sequence should be known to both the transmitter and the receiver. The cipher sequence may be pseudo-randomly generated at both the transmitter and the receiver using, for example, a cryptographically secure pseudorandom number generator (CSPRNG). Thus, the transmitter may generate a transmitter cipher sequence to include in a packet transmitted to the receiver, whilst the receiver may generate an identical receiver cipher sequence to compare against the received cipher sequence in the received packet. The respective cipher sequences may be generated by setting a common seed and nonce for initialization of the CSPRNG in both the transmitter and the receiver.

Thus, the method may further include, in the transmitter, generating a transmitter cipher sequence and transmitting a packet including the transmitter cipher sequence to the receiver.

Preferably, the method further comprises applying one or more countermeasure checks to the identified first correlation peak in the accumulator data that meets one or more criteria and then rejecting the identified first path and/or rejecting the data packet if the one or more countermeasure checks are not passed. By applying one or more countermeasure checks to the identified first correlation peak, it is possible to improve security.

Preferably, the step of identifying a first correlation peak in the accumulator data that meets one or more criteria comprises comparing the one or more identified peaks in the accumulator data to a threshold value to identify a first correlation peak that exceeds the threshold value.

In other words, one of the one or more criteria is exceeding a threshold value.

Preferably, the method further comprises computing the threshold value based on one or more of: a length of the cipher sequence; a pulse repetition frequency (PRF) of the cipher sequence; how much transmission power is used; a configuration of one or more sidelobe minimization receiver algorithms; a required security level; and static configuration of the receiver gain. These parameters are static parameters and, therefore, the threshold value may be predetermined or pre-configured.

Optionally, the method further comprises measuring one or more parameters and computing the threshold value based on the one or more measured parameters. Thus, it is possible to use dynamic parameters to set the threshold value. The threshold value may be selected as a function of both a pre-configured static parameter and also of one or more measured dynamic parameters (therefore, the threshold value may vary as the measured value(s) of the dynamic parameter(s) change).

For example, computing the threshold value may be done by analyzing the result of one or more executed diagnostic routines relating to the parameters.

In some embodiments, the one or more measured, dynamic parameters are selected from: average noise level in the accumulator (or accumulators, where more than one is used); the amplitude of the highest peak or peaks in the accumulator data before an expected first path; the strength of multipath reflections and the multipath profile; a carrier frequency offset (CFO); dynamic behavior of an automatic gain control (AGC) applied at the receiver; and a configuration of an analog-to-digital converter (ADC), preferably including converged ADC threshold values. The position of the expected first path peak may be estimated from the position of the first path peak found from the previously received Ipatov or SYNC sequence, or from a previous packet. By looking at the amplitude of the highest peak or peaks in the accumulator data ahead of the expected position of the first path in the accumulator data (sometimes referred to as the precursor area of the accumulator), it is possible to take into account noise levels.

Preferably, computing the threshold value comprises setting the threshold value to at least a predetermined minimum threshold value.

Optionally, the received data further comprises channel-distorted synchronization codes and a start of frame delimiter and/or payload data. Additionally, wherein identifying a first correlation peak in the accumulator data that meets one or more criteria comprises: recording one or more analog-to-digital output statistics at the receiver during reception of the channel-distorted cipher codes; recording one or more analog-to-digital output statistics at the receiver during reception of at least one of the synchronization codes, a start of frame delimiter, and payload data; determining that the value(s) of the one or more statistics received during the reception of the channel-distorted cipher codes does not differ from the value(s) of the statistics received during the reception of at least one of the synchronization codes, the start of frame delimiter, and the payload data by more than a predetermined difference value.

In some cases, there is a PRF change between the synchronization part and the cipher sequence. For example, an increase in the PRF between the synchronization part and the cipher sequence. In that case, the cipher ADC statistics received during the receipt of the cipher codes would be higher, so it is necessary to scale the statistics relating to the synchronization part (or relating to the cipher codes) before comparing the synchronization ADC statistics with the cipher ADC statistics. For example, in 4 z, an enhanced mode SYNC has a PRF=100 MHz and the cipher has a PRF=128 MHz, so, under normal conditions, the cipher would be expected to include 28% more pulses above the ADC threshold than the synchronization sequence. Thus, the method may further comprise scaling the value(s) of the ADC statistics for one of the channel-distorted cipher codes, synchronization codes, start of frame delimiter, or payload data based on the relative PRF and wherein the step of determining whether the value(s) of the one or more statistics during reception of the channel-distorted cipher codes does not differ from the value(s) of the statistics during reception of at least one of the synchronization codes, the start of frame delimiter, and the payload data by more than a predetermined difference value is based on the scaled value of the ADC statistic.

Preferably, the one or more analog-to-digital output statistics are indicative of the energy level of the ADC, preferably at the rate of energy per unit time.

Optionally, the receiver cipher sequence comprises a plurality of cipher symbols, and, wherein analyzing the received data comprises: identifying the correlation strength (and, preferably, phases) of each of the plurality of cipher symbols in the receiver cipher sequence with the plurality of channel-distorted cipher codes in the received data; counting the number of symbols that have a correlation strength above a specified minimum correlation strength threshold, and preferably also being within a phase limit; and, wherein the one or more criteria comprises: the number of symbols having a correlation strength above the specified minimum-correlation strength threshold (and, preferably, also being within a phase limit) being above a predetermined symbol correlation number threshold, or the proportion of the symbols in the receiver cipher sequence having a correlation strength above a correlation strength threshold (and, preferably, also being within a phase limit) being above a predetermined symbol correlation proportion threshold.

For example, the cipher sequence may comprise a predetermined number of cipher symbols, e.g., between 50 and 500 cipher symbols. In certain embodiments, the cipher sequence comprises 128 cipher symbols or 256 cipher symbols. Each symbol generally comprises of a number of pulses, for example, at least 50 and/or less than 500 pulses. For example, each symbol may be around 64 or 128 pulses. The cipher sequence may comprise a plurality of segments (e.g., between 2 and 10 segments or, for example, 2 or 4 segments), each segment being made up of a plurality of symbols (e.g., between 20 and 500 symbols, preferably between 50 and 200 symbols or, for example, 64 symbols). Each segment of the cipher sequence may be accumulated in a different accumulator at the receiver.

A method according to any claim in the current application, wherein the one or more criteria is based on monitoring the accumulator growth rate over time. The growth rate of the first path peak or at an expected location of the first path peak in the accumulator data may be measured. The expected location of the first path peak in the accumulator data may be found from determining the location of the first path peak from the Ipatov or SYNC sequence, or the location of the first path peak from one or more previously received packets from the same transmitter. In some embodiments, the growth rate of the first path peak in the cipher may be found after having identified a possible first path peak in the cipher accumulator data. The growth rate may, thus, be analyzed retrospectively to verify the first path peak is a true, authentic first path peak.

The criteria may be based on monitoring the accumulator growth rate at each of a plurality of delay times. Each of the plurality of delay times may be during the receipt of one of: the synchronization part, the Start Frame Delimiter (SFD), and/or a cipher symbol. Preferably, the monitoring of the accumulator growth rate is performed on both real and imaginary axes.

Preferably, monitoring the accumulator growth rate over time comprises: computing a linear growth function based on the accumulator data (such as the first path peak in the accumulator data) and comparing the accumulator growth rate (preferably at the first path peak) over time with the linear growth function; and, wherein one of the one or more criteria comprises the accumulator growth rate diverging from the linear growth function by less than a predetermined growth rate divergence threshold. Whether the accumulator growth rate diverges at more or less than the predetermined divergence threshold may be found using a function that calculates a metric of how far the accumulator growth rate deviates.

The growth rate may be diverging by more than the growth rate divergence threshold if the growth rate at any particular time differs from the gradient of the linear growth function by more than a predetermined gradient difference threshold.

In some embodiments, using the first path to calculate the time of flight and/or distance between the transmitter and receiver. Calculating the time of flight and/or the distance between the transmitter and the receiver may involve, first, calculating the TOA at the receiver. The TOA at the receiver can be found by identifying the peak in the cipher accumulator that corresponds to the first path (or the shortest, most direct path, e.g., a straight line), which is referred to herein as the "first path peak."

The method may further comprise: calculating a first time of flight between the transmitter and the receiver based on the first correlation peak in the ciphered accumulator data that meets the one or more criteria; accumulating correlations in the received channel-distorted synchronization data in a synchronization accumulator; calculating a second time of flight between the transmitter and the receiver based on a first correlation peak in the synchronization accumulator; and, wherein identifying the first path comprises: identifying the first correlation peak in the accumulator data that meets the one or more criteria as indicative of the first path if the first time of flight differs from the second time of flight by less than a predetermined time of flight difference threshold. In other words, there are additional criterion that must be met for accepting the time of flight of the first correlation peak as indicative of the first path between the transmitter and the receiver (which, therefore, can be used as an accurate representation of the time of flight between the two and can also be used to calculate the distance between the transmitter and the receiver). This additional criterion is that the calculated first time of flight and the calculated second time of flight differ by less than a time of flight difference threshold. The time of flight difference threshold may be predetermined.

The time of flight difference threshold may be less than 10 nanoseconds, preferably less than 5 ns, and more preferably less than 3 ns. Generally, the time of flight threshold will be at least around 0.2 ns, or at least 0.5 ns. In some embodiments, the time of flight difference threshold is at least 1 ns and not more than 5 ns, and in some embodiments, the time of flight difference threshold is at least 2 ns and not more than 4 ns. The accuracy of a first path detection is usually around +/−0.2 ns, but sometimes can be worse, such as in low signal to noise ratio (SNR) conditions, where the error may be up to +/−0.5 ns. Thus, if the first time of flight estimate has an error of +0.5 ns and the second time of flight estimate has an error of −0.5 ns, this would result in a 1 ns difference in total.

The method may further comprise: accumulating correlations in the received channel-distorted synchronization data in a synchronization accumulator; calculating a first time of flight between the transmitter and the receiver based on a first correlation peak in the synchronization accumulator; accumulating correlations in the received channel-distorted ciphered data in a cipher accumulator; calculating a second time of flight between the transmitter and the receiver based on a first correlation peak in the ciphered accumulator; and, wherein the calculation of the second time of flight comprises: accepting the second time of flight only if the calculated first time of flight differs from the calculated second time of flight by less than a predetermined time of flight difference threshold.

In some embodiments, the channel-distorted cipher codes in the received data correspond to at least a first data packet and a second data packet, and, wherein the method further comprises: calculating a first time of flight between the transmitter and receiver based on the first correlation peak in the cipher accumulator data that meets the one or more criteria in the first data packet; calculating a second time of flight between the transmitter and the receiver based on the first correlation peak in the cipher accumulator data that meets the one or more criteria in the second data packet; determining the difference between the calculated first time of flight and the calculated second time of flight; and accepting either the first time of flight or the second time of flight as identifying the first path of a data packet from the transmitter to the receiver only if the calculated first time of flight and the calculated second time of flight differ by less than a predetermined time of flight difference threshold. Thus, the final criteria for accepting the time of flight calculation comprises an additional criterion, being that the calculated first time of flight and the calculated second time of flight differ by less than a time of flight difference threshold.

Following this, in some embodiments, the correlation peak associated with the first data packet and the correlation peak associated the second data packet may only be identified as meeting the one or more criteria if the first time of flight differs from the second time of flight by less than a predetermined time of flight difference threshold.

Peaks may be associated with different data packets based on the identification of an SFD in the received data. Peaks separated in time by the receipt of an SFD may correspond to different packets.

In some embodiments, there is a PRF change between the synchronization/SFD/data and the cipher, and the ADC statistics can be scaled before being compared to provide a better comparison. For example, where the received data further comprises channel-distorted synchronization codes, a start of frame delimiter and/or payload data; then identifying a first correlation peak in the accumulator data that meets the one or more criteria comprises: recording a first set of one or more analog-to-digital output statistics at the receiver during reception of the channel-distorted cipher codes; recording a second set of one or more analog-to-digital output statistics at the receiver during reception of at least one of the synchronization codes, start of frame delimiter, and payload data; and, wherein identifying a first correlation peak in the accumulator data that meets one or more criteria comprises: determining a change in the PRF between the cipher codes and the at least one of the synchronization codes, start of frame delimiter, and payload data; scaling the first set of analog-to-digital output statistics based on the determined change; and determining that the scaled value(s) of the first set do not differ from the value(s) of the second set by more than a predetermined difference value; or scaling the second set of analog-to-digital output statistics based on the determined change; and determining that the scaled value(s) of the second set do not differ from the value(s) of the first set by more than a predetermined difference value.

Sometimes, prior to the step of receiving data at the receiver, the method comprises: generating a transmitter cipher sequence at the transmitter, the transmitter cipher sequence comprising a plurality of transmitter cipher codes; and transmitting a packet from the transmitter, the packet comprising the plurality of transmitter cipher codes.

In some embodiments, accumulating the identified correlations between the channel-distorted cipher codes and the receiver cipher codes comprises accumulating the correlations in a plurality of cipher accumulators and identifying one or more peaks based on multiple of the cipher accumulators.

The cipher sequence may comprise a plurality of segments, each made up of a plurality of symbols, e.g., N segments. Typically, cipher segments are 4096 pulses, made up of 64 symbols each of 64 pulses. Therefore, multiple segments (e.g., N segments) are N*4096 pulses separated by a gap. Each segment would generally be accumulated into a separate accumulator. Thus, there may be N cipher accumulators. N is generally between around 2 and 10.

A method according to any claim in the current application, wherein the plurality of channel-distorted cipher codes and/or the plurality of transmitter cipher codes and/or the plurality of receiver cipher codes comprises a plurality of sets of codes.

For example, the plurality of channel-distorted cipher codes and/or the receiver cipher sequence and, preferably, the transmitter cipher sequence comprises of N sets of m cipher codes.

In some embodiments, each of the sets of channel-distorted cipher codes is received at the receiver in a different segment, and, preferably, wherein the correlations in each segment are accumulated in a separate accumulator.

Generally, the transmitter will transmit each set of transmitter cipher codes in a different segment. For example, each of the N sets of a transmitter cipher is transmitted in a different segment of a data packet.

In some embodiments, analyzing the received data to identify correlations between the plurality of channel-distorted cipher codes in the data packet and the plurality of receiver cipher codes comprises: developing a set of m channel correlations by correlating each of the channel-distorted cipher codes with a corresponding receiver cipher code of the receiver cipher set with the corresponding code of the channel-distorted cipher codes.

Preferably, the method further comprises: calculating a first time of flight between the transmitter and receiver based on a correlation peak associated with a first segment; calculating a second time of flight between the transmitter and receiver based on the correlation peak associated with a second segment, preferably wherein the first and second segment are associated with the same data packet; and wherein the one or more criteria comprise the calculated first time of flight and the calculated second time of flight differing by less than a predetermined time of flight difference threshold.

For example, the correlation peak associated with the first segment and the correlation peak associated the segment may be identified as meeting the one or more criteria only if the first time of flight differs from the second time of flight by less than a predetermined time of flight difference threshold. The correlation peaks for the first and second segments may be identified in the accumulator data for the first and second accumulators, respectively. For example, the method comprises: calculating a first time of flight between the transmitter and receiver based on a first correlation peak of a first segment in the ciphered accumulator data that meets the one or more criteria; calculating a second time of flight between the transmitter and receiver based on a first correlation peak of a second segment in the ciphered accumulator data that meets the one or more criteria, preferably wherein the first and second segments are associated with the same data packet; and accepting one of the first time of flight and the second time of flight as identifying the first path of a data packet from the transmitter to the receiver only if the calculated first time of flight and the calculated second time of flight differ by less than a predetermined time of flight difference threshold.

In some embodiments, the identified correlations are accumulated in a plurality of accumulators and the method further comprises: identifying a plurality of first correlation peaks that meet the one or more criteria, each identified first correlation peak corresponding to one of the plurality of accumulators; comparing the distribution of the accumulator data around each of the identified first correlation peaks; and using the identified plurality of first correlation peaks to identify the first path of a data packet from the transmitter only if the distribution of the accumulator data around each of the identified first correlation peaks is sufficiently similar.

The plurality of accumulators may each relate to different cipher accumulators (e.g., for different segments of the cipher) and/or different parts of the data packet (e.g., synchronization, cipher, and/or SFD). The data around each of the peaks is preferably data in a region directly surrounding the peak, for example, a predetermined number of accumulator values surrounding the peak (e.g., temporally surrounding), for example, at least 10 accumulator values surrounding the peak, or at least 20 accumulator values surrounding the peak. Normally, fewer than 100 accumulator values are surrounding the peak. Generally, the data that is considered symmetrically surrounds the peak value.

Determining whether the distribution is sufficiently similar may be performed by calculating a function indicative of the probability that the accumulator data around each of the identified first correlation peaks is the same.

The distribution of accumulator data may be the channel estimate amplitudes.

Preferably, the method further comprises determining if the distribution of the accumulator data around each of the identified first correlation peaks is sufficiently similar by calculating a measure of the distribution similarity and determining if the distribution similarity is within a similarity threshold.

The distribution similarity measurement, in one example, is a rank sum test.

Optionally, the method further comprises: prior to determining if the distribution of the accumulator data around each of the identified first correlation peaks is sufficiently similar: normalizing the data around each of the identified first correlation peaks based on one or more of: the amplitude of the corresponding correlation peak; the length of the corresponding sequence (e.g., cipher segment or synchronization sequence); and the number of energy pulses detected during accumulation of the corresponding sequence.

Optionally, the received data further comprises a plurality of channel-distorted synchronization codes and the method further comprises: developing, preferably at the receiver, a synchronization-based channel estimate from the received data packet based on the plurality of channel-distorted synchronization codes.

In such a case, the packet transmitted by the transmitter would comprise a plurality of synchronization codes. The synchronization codes could, for example, be Ipatov codes. Developing a channel estimate from the channel-distorted synchronization codes may comprise correlating the channel-distorted synchronization codes with expected synchronization codes and accumulating repeating correlations in a synchronization accumulator. Identifying one or more peaks in the accumulator data may also be based on the synchronization accumulator (e.g., in addition to one or more cipher accumulators).

In some embodiments, the method further comprises developing, at the receiver, a channel estimate from the received data packet based on the plurality of channel-distorted cipher codes.

Optionally, identifying a first correlation peak in the accumulator data that meets the one or more criteria comprises: selecting a channel-matched filter based on a or the channel estimate; demodulating the received data using the channel-matched filter; and identifying that one of the one or more criteria is met if the demodulated data is correct. Thus, the final criteria for accepting the first peak as being indicative of the first path includes the demodulated data being correct based on a channel estimate. The data may be identified as being correct if it matches expected data.

The method may comprise determining whether the demodulated data is correct by using a cyclic redundancy check (CRC).

Optionally, identified correlations are accumulated in a plurality of accumulators and the method further comprises: identifying a plurality of first correlation peaks that meet the one or more criteria, each identified first correlation peak corresponding to one of the plurality of accumulators; comparing the phase of the channel estimate data at each of the identified first correlation peaks; and using the identified plurality of first correlation peaks to identify the first path of a data packet from the transmitter only if the phase of the accumulator data at each of the identified first correlation peaks is within a phase difference threshold. Thus, the final criteria for accepting that the peaks are indicative of the first path includes the phase at each of the peaks being within the phase difference threshold.

The phase difference threshold is preferably small, e.g., 10 degrees or less, or 5 degrees or less. The phase difference threshold may be around 4 degrees, for example. Preferably, the phase difference threshold is at least 1 degree or at least 2 degrees. In some embodiments there are transition-related phase changes (e.g., between sequences), such as predetermined phase offsets. In such cases, the phase difference threshold would be a threshold surrounding the predetermined phase offset.

Comparing the phase at each of the correlation peaks may comprise calculating the phase difference between consecutive samples at each of the peaks.

The method may further comprise: determining a channel estimate corresponding to each of the first correlation peaks of each accumulator; and wherein comparing the phase of the accumulator data comprises comparing the phase of each determined channel estimate.

Preferably, the identified correlations are accumulated in a plurality of accumulators and the method further comprises: identifying a plurality of first correlation peaks that meet the one or more criteria, each identified first correlation peak corresponding to one of the plurality of accumulators; comparing the phase of the channel estimate data at each of the identified first correlation peaks; and using the identified plurality of first correlation peaks to identify the first path of a data packet from the transmitter, only if the phase of the accumulator data at each of the identified first correlation peaks is the same or differs by a predetermined phase offset, within a phase difference threshold. The phase offset is preferably at least 80 degrees and not more than 180 degrees. For example, the phase offset may be at least 100 degrees and/or not more than 150 degrees. In some embodiments the phase offset is between 130 degrees and 140 degrees. The phase difference threshold (discussed above) means that values within the difference threshold of the phase offset will be accepted. For example, the phase difference offset may be around 138 degrees, within a tolerance or threshold of around 4 degrees.

This may comprise selecting a plurality of samples (e.g., four samples, preferably two or more, preferably fewer than 10 samples) surrounding or immediately following the peak.

Optionally, the one or more criteria are based on a classification that was learned from a training data set. Thus, the classification can be derived from machine learning.

For example, the one or more criteria may be learned using a logistic regression-based assessment.

Preferably, the method further comprises: converting the received data from analog to digital using an ADC having limited resolution restricted to five or fewer levels, preferably three or fewer levels (e.g., only two or three levels at the ADC output). It is conventional to use more levels of ADC output, such as 8 or 10 levels. However, the inventors have found that reducing the resolution provides improved results.

Optionally, the received data comprises channel-distorted synchronization codes received prior to the receipt of the plurality of channel-distorted cipher codes; the method further comprising: selecting gain and/or ADC parameter(s) based on the channel-distorted synchronization codes; and maintaining the selected gain and/or ADC parameter(s) during the receipt of the plurality of channel-distorted cipher codes.

In some embodiments, the received data comprises channel-distorted synchronization codes, a start of frame delimiter, and/or payload data; the method further comprising: reading a first set of gain and/or ADC parameter(s) based on the channel-distorted synchronization codes, the start of frame delimiter, and/or the payload data; reading a second set of gain and/or ADC parameter(s) based on the received plurality of channel-distorted cipher codes; determining differences between the first set of gain and/or ADC parameter(s) and the second set of gain and/or ADC parameter(s); and using the first correlation peak to identify the first path, only if the determined differences do not exceed a predetermined parameter threshold for each of the parameter(s). Thus, the final criteria for accepting the time of flight may comprise the requirement that the determined differences do not exceed a predetermined parameter threshold for each of the parameter(s). For example, one of the one or more criteria may only be met if the determined differences do not exceed a predetermined parameter threshold for each of the parameter(s).

Sometimes, the method further comprises: estimating the CFO based on the received data; calculating the timing offset of the received data to compensate for an offset between a clock of the receiver and a clock of the transmitter, wherein the adjustment of the receiving time is based on the estimated CFO; wherein the timing adjustment is limited to a predetermined maximum adjustment, preferably based on a predetermined packet duration and/or maximum allowed CFO; and adjusting the timing offset of the received data by no more than the calculated adjustment.

Preferably, generating the cipher sequence is performed by pseudo-random generation as a function of a seed, wherein the same seed is used by the transmitter and receiver. The same nonce may also be used by the transmitter and receiver in order to generate the cipher sequence.

Preferably, in a single-sided two-way ranging with the first message transmitted by the initiator and the second message transmitted by the responder, the method further comprises: estimating a first carrier frequency offset (CFO1) based on the first data packet received by the responder; estimating a second carrier frequency offset (CFO2) based on the second data packet received by the initiator; and identifying that a correlation peak in the accumulator data meets one or more criteria only if the CFO1 is sufficiently close to −CFO2.

Optionally, the method further comprises the receiver performing the analysis of the noise distribution before the candidate first path peak and identifying that a correlation peak in the accumulator data meets one or more criteria only if the noise distributions is sufficiently similar to typical Gaussian noise distribution. A method according to any claim in the current application, wherein analyzing the received data to identify correlations between the plurality of channel-distorted cipher codes in the data packet and the plurality of receiver cipher codes comprises: developing a set of channel correlations by correlating each of the channel-distorted cipher codes with a corresponding receiver cipher code.

In some embodiments, the method further comprises: designating identified peaks in the accumulator data that occur prior to the first correlation peak that meet the one or more criteria as corresponding to false early first paths.

Optionally, the method further comprises: estimating, at the receiver, a CFO1 estimate associated with the received data; receiving, at the receiver, a CFO2 estimate calculated by the transmitter; comparing the CFO1 estimate and the CFO2 estimate; and wherein one of the one or more criteria is met if the first frequency offset estimate differs from the negative of the second frequency offset estimate by less than a frequency offset difference threshold.

The frequency carrier offset relates to the difference in clock frequencies of the transmitter and receiver, e.g., the relative clock frequencies.

The CFO2 may be received in the data at the receiver over the wireless communication protocol (e.g., by UWB communication). For example, the received data may include payload data that comprises the CFO2 estimate. In alternative embodiments, the CFO2 is received over a different communication protocol from the one over which the received data is received.

The CFO2 estimate may have been estimated at the transmitter and, for example, may have been based on a previous data packet transmitted from the receiver to the transmitter.

The frequency offset difference threshold is generally less than 5 ppm, preferably not more than 2 ppm, or may even be 1 ppm.

It is necessary to consider the negative since these offsets are relative offsets, so they will be the inverse of one another. In other words, the one or more criteria may be met if the first frequency offset estimate differs from the opposite sign of the second frequency offset estimate by less than a frequency offset difference threshold A method is also described herein for use in a wireless communication system comprising of a transmitter and a receiver, the method comprising: receiving, in the receiver, data comprising a plurality of channel-distorted synchronization codes; estimating, at the receiver, a CFO1 estimate associated with the received data; receiving, at the receiver, a CFO2 estimate calculated by the transmitter (e.g., calculated by the transmitter based on a packet previously sent from the receiver and received by the transmitter); comparing the CFO1 estimate and the CFO2 estimate; and determining that the likelihood of an attack is increased if the CFO1 estimate differs from the negative of the CFO2 estimate by more than a frequency offset difference threshold. If the first frequency offset estimate differs from the negative of the second frequency offset estimate by more than a frequency offset difference threshold, the final criteria for accepting the peaks as being indicative of the first path between the transmitter and the receiver will not be met, and so the correlation peak will not be used to perform the time of flight measurement for the first path.

In some embodiments, the method further comprises: discarding the received data if the first frequency offset estimate differs from the negative of the second frequency offset estimate by more than a frequency offset difference threshold Preferably, identifying that a correlation peak in the accumulator data that meets one or more criteria comprises: determining the distribution of the accumulator data in the accumulator prior to the peak; and identifying that the peak meets one of the one or more criteria if the distribution of the accumulator data in the accumulator has a substantially normal distribution. Thus, the final criteria for accepting a peak as being indicative of the first path may comprise that the distribution of accumulator data is substantially normal.

Sometimes, determining the distribution of the accumulator data comprises: calculating the mean noise value (MNV) of the accumulator data prior to the peak; and determining the proportion of accumulator samples in the accumulator data prior to the peak that exceed a threshold multiple of the MNV (for example, two MNV, three MNV, five MNV, or seven MNV); and wherein the criteria is based on the proportion of accumulator samples that exceed the threshold multiple of the MNV.

By prior to the peak, we mean the accumulator data that is temporally before the peak in the accumulator data.

There is also described herein a device or system having means for performing a method as set out above.

There is also described herein a wireless receiver configured to: receive data comprising of a plurality of channel-distorted cipher codes; generate a receiver cipher sequence comprising of a plurality of receiver cipher codes; analyze the received data to identify correlations between the plurality of channel-distorted cipher codes in the received data and the plurality of receiver cipher codes; accumulate the identified correlations as accumulator data in an accumulator; identify one or more peaks in the accumulator data; identify a first correlation peak in the accumulator data that meets one or more criteria; and use the first correlation peak to identify the first path of a data packet from a transmitter.

The receiver may be further configured to perform or participate in the methods described above.

There is also described herein a wireless communication system comprising: a receiver as described above and a transmitter.

There is also described herein computer-readable medium comprising software code that is adapted to, when executed by a data processing device, perform a method as set out above.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWING FIGURES

Methods and systems for ultra-wideband communications are described by way of example only, in relation to the Figures, wherein.

DETAILED DESCRIPTION

Ultra-wideband (UWB) systems can provide distance determination between a transmitter and a receiver by analyzing the time-of-arrival (TOA) of packets at the receiver. The UWB systems can be characterized by having either low-rate pulses (LRP) or high-rate pulses (HRP). In systems with LRP, the pulses are transmitted at a lower rate (e.g., around 1 MHz), but at higher power per pulse than in systems with HRP (the typical rate of the pulses in systems with HRP can be >64 MHz).

Figure 1:
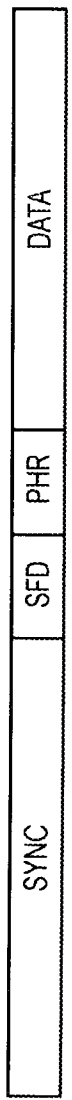
FIG. 1 shows an ultra-wideband (UWB) physical layer (PHY) frame structure.

The IEEE standard 802.15.4-2011 describes a UWB physical layer (PHY) with a frame structure and two way ranging abilities, as shown in FIG. 1. The following abbreviations are used in FIG. 1 and subsequent diagrams to denote certain portions of the frames:

SYNC—Sync pattern
SFD—Start Frame Delimiter
PHR—PHY Header

The Sync pattern is a sequence of symbols forming a frame preamble, which may be based on a predefined code sequence having certain properties that make it useful for channel sounding purposes (including perfect periodic autocorrelation).

From the ranging security perspective, this structure has the following vulnerabilities:

1) If the start of the SYNC is known in advance or detected by listening to the packet, the rest of the SYNC is entirely predictable.
2) The SYNC is periodic (i.e., it repeats the same symbol again and again), so a version which is delayed by just one symbol looks almost identical to the original with no delay.
3) An attacker could transmit identical SYNC or retransmit the genuine SYNC with such a delay to inject false correlation peaks into the accumulator, thus affecting the ranging procedure.

While multiple countermeasures are possible to prevent such an attack, an attacker, in theory, could come up with even more sophisticated attacking equipment and mechanisms in order to defeat the countermeasures. In general, the methods described herein deal with a problem of designing an improved first path detection method that allows the receiver to select the true first path originated from a genuine transmitter in a secure way, that is, without false-positive earlier detections (for example, without being triggered by noise peaks, channel types, hardware imperfections, or the attacks).

In order to address these vulnerabilities and to provide means for more secure channel sounding and ranging, an additional cryptographically-generated (CIPHER) sequence may be appended (or inserted) to the packet. The CIPHER sequence can consist, for example, of pulses of pseudorandom polarity, which would not be repeatable or predictable (for example, the pulses could be generated by a cryptographically secure pseudorandom number generator (CSPRNG)).

Figure 2:
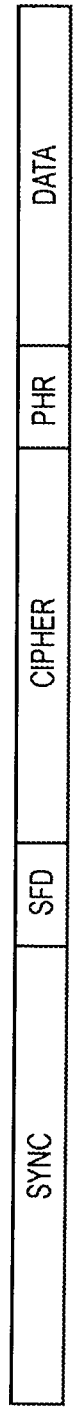
FIG. 2 shows a UWB frame with a cipher sequence inserted before the payload data.
Figure 3:
FIG. 3 shows a UWB frame with a cipher sequence appended after the payload data portion.

FIG. 2 shows a UWB frame with a cipher sequence inserted before the data. FIG. 3 shows a UWB frame with a cipher sequence appended at the end.

The cipher contains expected, cryptographically generated pulses (or bits). A typical length of cryptographically generated key (or cipher) can be 32, 64, or 128 in the case of systems with LRP and 4096, 8192 . . . , N*4096 in the case of systems with HRP.

Due to the much lower number of pulses in systems with LRP, a high level of security can only be achieved if all of the bits (or at least nearly all of the bits) are received correctly, whereas in systems with HRP, the ranging exchange can still be extremely secure if a significant number of bits are received incorrectly (even >40% of the bits).

In both systems with LRP and HRP, the receivers work on the basis of comparing the received bits to a locally generated reference. This can be implemented in the form of a correlator (with an accumulator), which cross-compares the incoming signal at various delays. Each delay in the accumulator will correspond to a certain distance travelled by the signal; closer distances will result in correlations at earlier delays in the accumulator. Alternatively, instead of using longer accumulators, it is possible to verify correlation at only one delay; in this case the system needs to know the most probable distance/delay (possibly from earlier sequences/preambles or exchanges) and use the ciphered sequence for its verification. Certain threshold levels can be implemented to verify if the obtained correlation is strong enough to signify a securely received first path.

A Channel Impulse Analysis (CIA) algorithm is responsible for the analysis of any of the channel impulse response estimates that are stored in the accumulators. It can determine the location of the first path and, from that, calculate the time-of-flight (TOF), the TOA, and, finally, the distance between the transmitter and the receiver. It also computes the phase of the first path and, depending on an implemented phase-difference-of-arrival (PDOA) mode, it can also compute the phase difference between the appropriate accumulators. It can compensate for known changes in the analog front end, such as delay changes due to the gain control decisions or temperature variations.

The ranging will be secure if the receiver is able to determine the position of the first path very reliably, despite any presence of noise, various hardware imperfections, and even malicious actions performed by the attackers. While an attacker cannot predict the cipher sequence to introduce an earlier correlation peak, it can attempt to confuse the receiver by transmitting various interfering patterns, even completely disregarding the regulatory transmit power limits. Such malicious transmissions could tamper with the reception of the ciphered sequence. Therefore, one of the goals of the methods described herein is to verify the integrity of the received cipher sequence, despite distortion that may be introduced due to the transmission channel.

Figure 4:
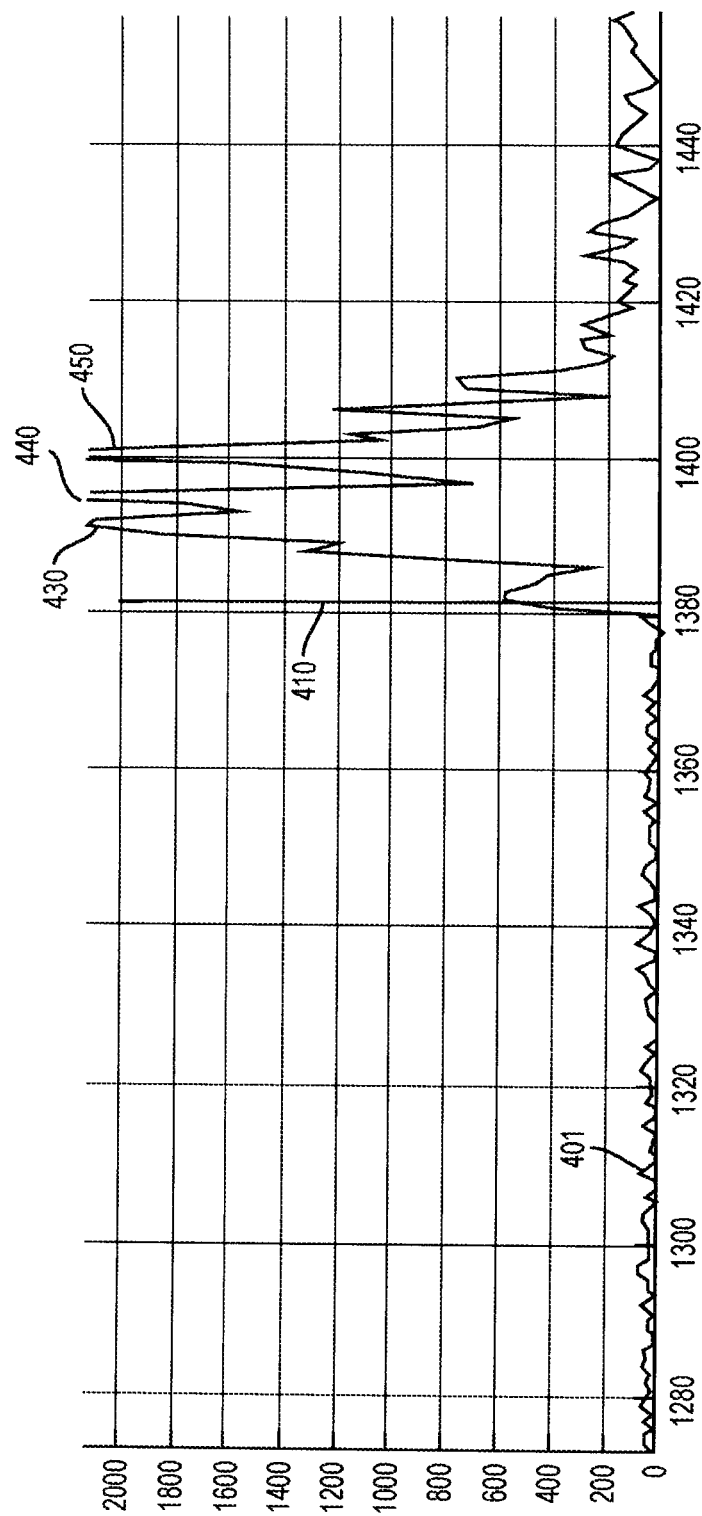
FIG. 4 shows an example channel count plot from a cipher accumulator.

FIG. 4 shows an example channel count plot 401 from a cipher accumulator, a weak early path (marked by vertical line 410), and strong reflections 430, 440, 450.

Figure 5:
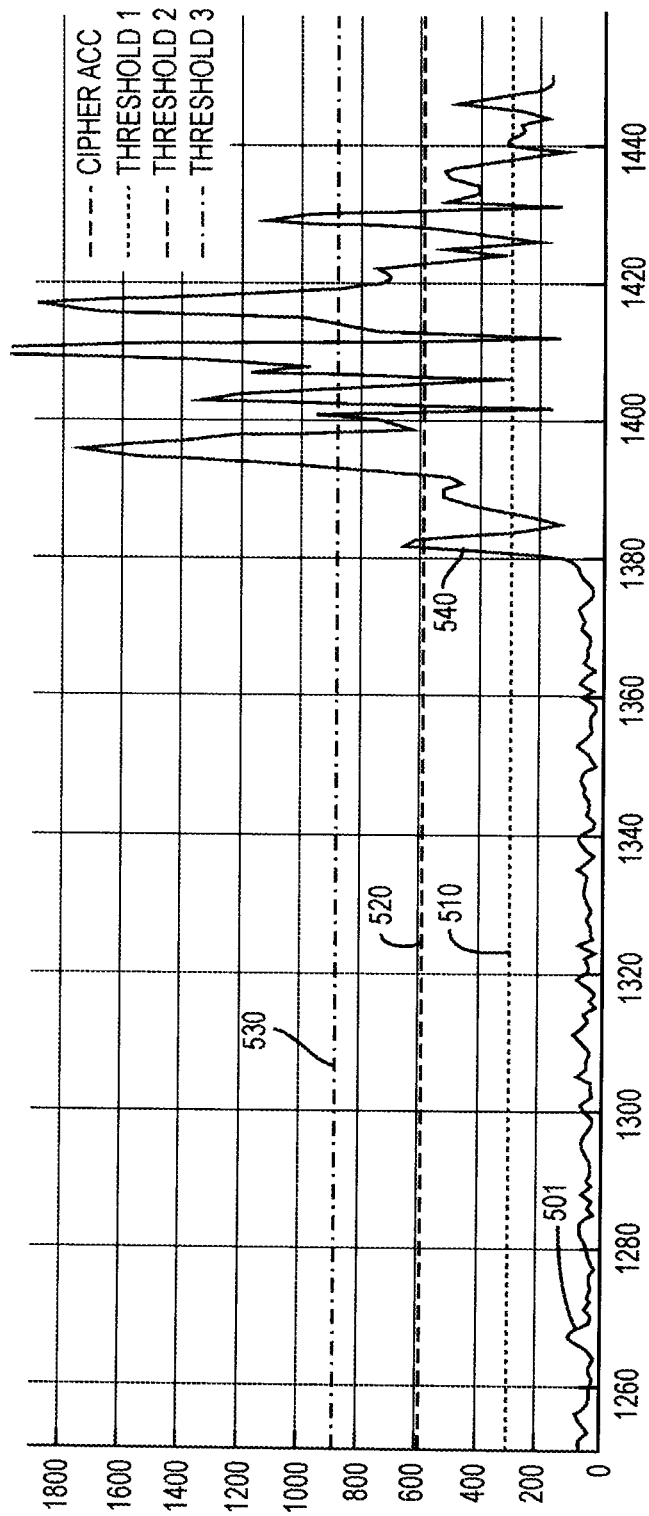
FIG. 5 shows another example channel count plot from a cipher accumulator and various possible detection threshold levels.

While ranging security can be improved simply by configuring a higher detection threshold, it would also reduce the sensitivity. In FIG. 5, another example channel plot 501 forms a cipher accumulator and various possible detection threshold levels, a first threshold 510, which is at around a level of 290 (correlation strength), a second threshold 520, which is at around a level of 595, and a third threshold 530, which is at around a level of 880 are shown. The third threshold 530, while theoretically offering the highest protection against false first path detection in this example, would result in the peak of the genuine first path 540, which is only at a level of 620 to be missed.

The first path detection algorithm does not necessarily need to be based on locating the first sample that is higher than the threshold. Multiple approaches could be used, for example, testing various "conditional" lower thresholds. Using a lower threshold could help identify earlier and weaker first paths and may be used in conjunction with additional verification steps to maintain a higher security level. The additional verification steps could, for example, include comparing the first path positions obtained through sending and receiving two cipher segments or ciphers from two separate packets.

In order to maintain very high security without significant sensitivity degradation, improved methods could take into many more factors when deciding which early correlation peaks are potential candidates and whether to accept them or not. Some methods could eliminate potential attacks by detecting harmful interference and, if present, ignore the ranging result.

There are described herein a number of steps and checks that may be performed and taken into account during the process of secure first path detection to improve security.

One of the possible attack mechanisms could involve the malicious attacker triggering ranging exchanges constantly and transmitting random bit patterns which overlap the genuine transmission in time but at a higher power, thus overwriting the original message, in the hope of triggering sufficiently high correlation in the earlier part of the accumulator so that the receiver would interpret the artificially inserted correlation peaks as a genuine one.

Depending on the required security level, stronger or weaker requirements can be placed on the correlation threshold.

In the case of systems with LRP that require 100% bits (or nearly 100% bits, depending on the security level) to be correct, it is easy to establish that the probabilities of successful attack for 32, 64, and 128 bit long keys are: $2^{(-32)}$ (2.33e-10), $2^{(-64)}$ (5.42e-20), and $2^{(-128)}$ (2.94e-39), respectively (assuming that 100% bits need to be received correctly).

In the case of systems with HRP, the same probabilities as in systems with LRP can be achieved. In order to match the security level of 32, 64, and 128 bit long LRP keys, an example HRP receiver using a 4096 bit cipher sequence would need to set the detection threshold at the levels corresponding to approximately a 55%, a 57%, or a 60.5% rate of the correctly received bits.

Figure 6:
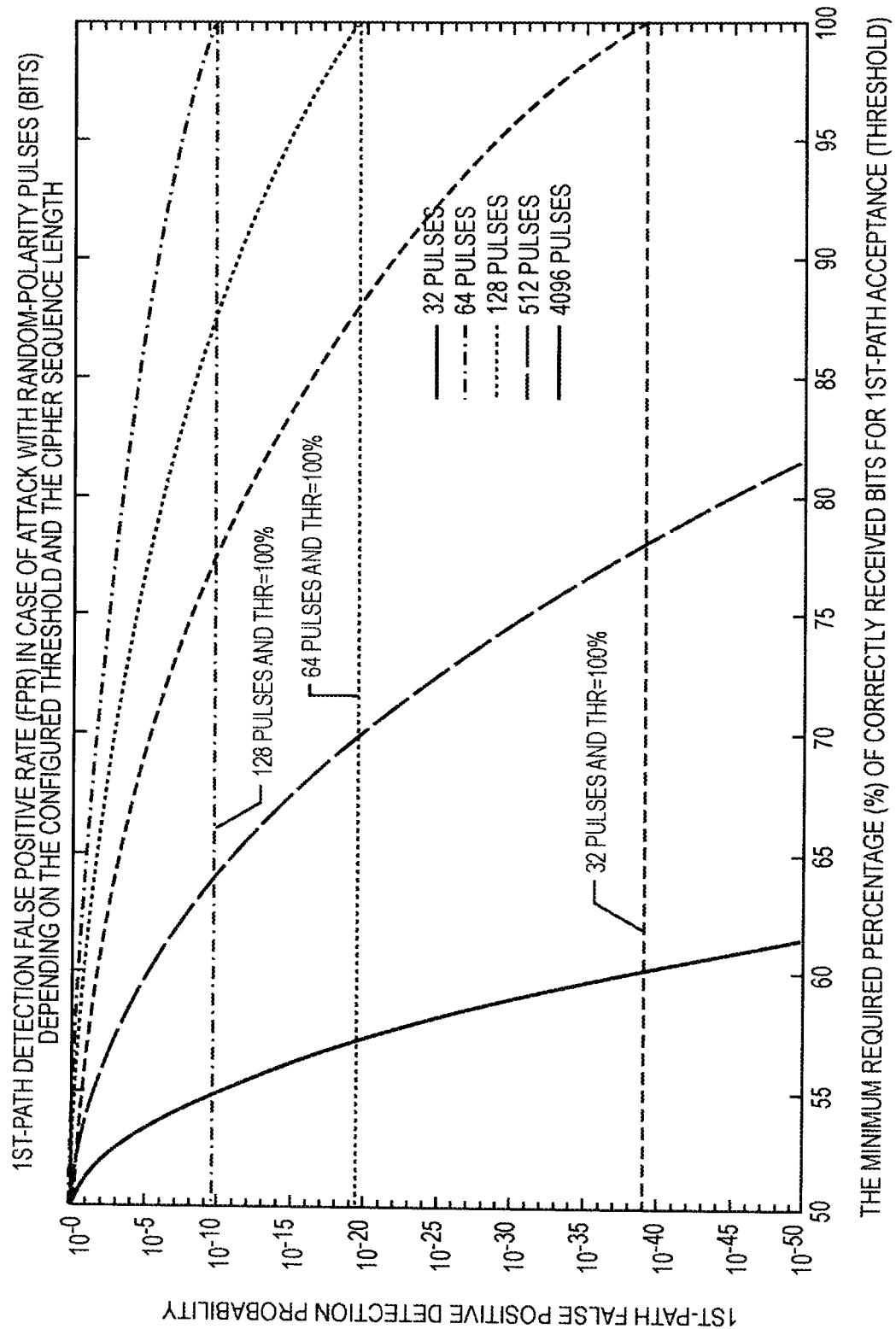
FIG. 6 illustrates probabilities of random attacker sequences satisfying an acceptance threshold for various acceptance thresholds.
Figure 7:
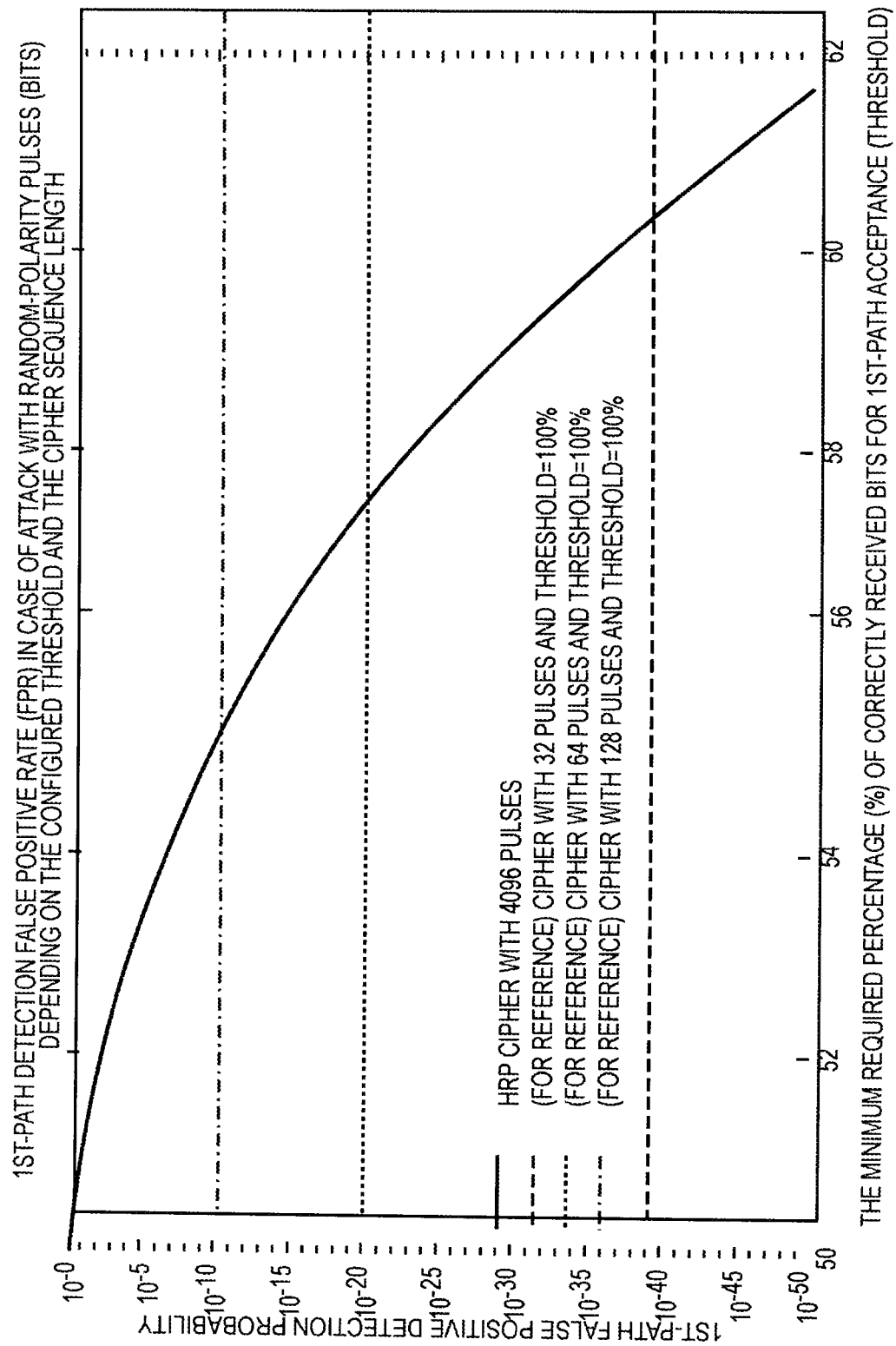
FIG. 7 shows false-positive detection rates in the case of a 4096-bit long HRP system.

FIG. 6 illustrates the minimum required percentage of correctly received bits for first path acceptance thresholds for a 32 bit, 64 bit, 128 bit, and 4096 bit key. FIG. 7 shows false-positive detection rates in the case of a 4096 bit long HRP.

FIG. 6 shows the probability of an attacker guessing (e.g., by transmitting random bits) more than or equal to a certain percentage of bits in the system with HRP (that is configured for 4096 ciphered pulses), which would result in certain correlation peaks. For the purpose of this example, we assume that the correlation peak amplitude is always a positive (absolute) value, i.e., a negative correlation would cause a certain (positive) amplitude peak. For example, guessing all bits incorrectly results in a correlation peak of −4096, but, in this example, as we ignore the peak sign, it would be equivalent to +4096.

The sign is ignored because, when using a coherent receiver on a multipath channel, each path will have a different phase. Even if the receiver attempts to lock the main (strongest) path to a certain phase (such as 0 degrees), the first weaker path could have a completely different phase. Therefore, in post-processing, when searching for the first path, phases are ignored and absolute values are analyzed. Therefore, setting the correlation threshold at 0 would result in a 100% false positive rate because the absolute correlation result will always be greater than or equal to 0.

FIG. 6 demonstrates that it is equally hard to guess all 128 out of 128 bits (in a system with LRP) as it is to guess at least 2478 bits out of 4096 bits (more than 60% guessed bits in a system with HRP).

In the vast majority of cases, the attacker on the system with HRP, transmitting random bit patterns, will guess fewer than 2148 bits correctly (2048 bits on average). The probability of guessing more than 2148 bits is 0.0019, guessing more than 2200 bits is 2.175e-06, and guessing more than 2248 bits is 4.3983e-10. It is therefore possible to set a threshold depending on particular security requirements.

It is also possible to have longer HRP cipher lengths (N*4096) which will result in even lower probabilities of a successful attack for a given threshold (relative to the peak correlation).

Both in systems with LRP and HRP, a designer can select a set of parameters which will result in any desired security level. If the probability requirement of a successful attack is, for example, lower than 1e-19, in a system with LRP, a 64 bit long key should be used and in case of a system with HRP and a 4096 bit cipher, a detection threshold higher than 2340 correct pulses should be used. By choosing the appropriate parameters, almost any security level can be configured and achieved in both systems with LRP and HRP.

Both systems with LRP and HRP have sensitivity limits, where it would be harder to detect a very weak first path. Due to limited transmission power, increasing the security level inversely correlates with the sensitivity. In systems with LRP, more secure and longer sequences will result in power reduction per pulse/bit, thus reducing sensitivity. In systems with HRP, increasing the correlation threshold will have a similar effect.

In the case of systems with LRP where there is a (nearly) 100% correctness requirement, any short-lasting glitch or interference (even if it is not necessarily malicious, as it could come from an impulse noise source nearby, e.g., another unrelated UWB transmitter) affecting even a single bit will result in a failed ranging exchange. Systems with HRP, on the other hand, are more robust and can tolerate interference and destruction of a significant part of the cipher. For example, with a very secure threshold set to 2340 correct bits, even up to 1756 bits out of 4096 bits could be destroyed and correlation from the remaining bits could still be strong enough to pass (assuming that the remaining bits can be received with sufficient quality).

In order to provide a more secure way of ranging and distance estimation, we provide a method for use in a wireless communication system comprising a transmitter and a receiver. Both the transmitter and the receiver pseudo-randomly generate, as a function of the same seed, identical code sets of m codes. Note that a code could be a simple Binary Phase Shift Keying (BPSK) positive or negative pulse or it could be a longer code, e.g., a length k golay code or even a pseudo randomly selected random binary code. The receiver then may additionally modify the receiver code set in order to, for example, reduce the number of correlation sidelobes. The transmitter then transmits the transmitter code set and the receiver receives a channel-distorted form of the transmitted code set. The receiver then develops a set of m channel correlations by correlating each code of the generated receiver code set with the corresponding code of the channel-distorted form of the transmitter code set and, finally, develops a channel estimate by accumulating the set of m channel correlations.

In one embodiment, the receiver processes the channel estimate identifying the earliest correlation peak fulfilling certain required criteria. The earliest correlation peak location will affect the time-of-flight measurement, hence the distance between the transmitter and the receiver. There may be multiple criteria that must be met for acceptance of the peak as a valid correlation peak (i.e., a packet received from a genuine transmitter). In the simplest case, it could be that its amplitude exceeds a pre-configured fixed threshold. The value of such a threshold may depend on one or more parameters. Such parameters may be predetermined or static. In some embodiments, the threshold selection may be based additionally or alternatively on dynamic parameters. Example parameters are transmission power, the required security level, noise level in the accumulator, a length of the cipher sequence, detected channel characteristics such as the strength of reflections, carrier frequency offset (CFO), or gain parameters (e.g. automatic gain control (AGC)). Using multiple and/or dynamic parameters can improve the receiver's first path sensitivity by allowing the detection threshold to be lowered while still providing the required security level.

In some embodiments, the final threshold selecting algorithm may combine both static and dynamic parameters. Where the threshold value is a function of dynamic parameters, a static minimum threshold value can also used. If the threshold value calculated initially based on the one or more dynamic (and, optionally, static) parameters is lower than a predetermined minimum threshold value (which may itself be based on other static parameters), then the minimum level would be used for the comparison. The minimum threshold level could be either a fixed value or depend on certain static parameters such as cipher length, transmit power, the required security level or others. Therefore, even in a case where the detection threshold calculation depended on the accumulator noise levels and the accumulator was almost noiseless (for example, as a consequence of a malicious attack), accidental noise samples would not trigger false detection.

In some embodiments, the receiver can be configured to use a low resolution analog to digital converter (ADC) (for example, 1 bit consisting of a single threshold (i.e., 2 levels) or 1.5 bits consisting of two thresholds (i.e., three levels)) as compared to typical ADCs, which generally have higher resolutions (e.g., 3 bits or more). One possible attack mechanism is for the attacker to use increased power for a small portion of the channel sounding sequence, e.g., to send a signal with random polarity at a much higher power than the rest of the sequence. Because this signal has higher power, it will give a higher correlation peak in the victim receiver than the true signal, and much fewer correct guesses would be necessary to trigger a bogus first path detection. One way to defeat such an attack is to have a receiver with a lower resolution, e.g., with a small number of ADC levels (e.g., 2, 3, 4, 5, 6, or 7 levels as compared to the usual receiver ADC with 8 or more levels (3 bit or more ADCs are common in wireless receivers)), and to fix the thresholds for these levels and the receiver gain (or to only allow them to change by a small factor) during the reception of the channel sounding sequence.

In one other embodiment, the function controlling the acceptance of the cipher correlation peak as a valid peak may also use additional information and statistics collected earlier during the entire packet reception (and/or also collected during the reception of previous packets and/or during the silence period). This information may, for example, indicate if there is something unusual present in the received signal, which could interfere with the proper functioning of the receiver and of the earliest path detection algorithm, in particular. In that case, the algorithm would not only adapt the first path acceptance threshold (as discussed before), but could also conditionally reject certain packets, for example, if certain diagnostic information about channel quality was not satisfactory.

Examples of such diagnostics and possible interference could be the attacker using equipment and methods to distort the signal in order to try to influence the measured distance. The attacker could use, for example, UWB transmitters and/or amplifiers, transmitting various bursts of interference or other patterns, or retransmitting the original signal at much higher power, possibly with some distortion. The purpose of the attack could be to inject an artificial glitch or correlation peak into the accumulator, which could be interpreted as a genuine correlation peak, resulting in reduced measured distance. In order to prevent such an attack from having any effect, the receiver can employ multiple additional methods and tests and collect additional diagnostic information for its analysis. This could include:

- Verification that ADC output statistics are at least substantially unchanged during the reception of the whole data frame. The statistics of the ADC output during the cipher may be compared to the expected or measured ADC output statistics during earlier sequences (e.g., Ipatov synchronization, data symbols). ADC statistics can, for example, include the number of pulses with high, medium, or low energy per some unit of time, such as, for example, symbol duration. Such analysis would confirm whether the received signal properties were constant during the packet or if they were changed (for example, as a result of the attacker transmitting shorter bursts of signal or interference or transmitting interference only during the ciphered part of the packet).
- Freezing the gain settings and/or ADC parameters after the initial synchronization state in order to prevent potential attacks, which could affect the receiver's gain settings. Freezing the receiver gain settings should result in constant and predictable signal receive power. It also makes it easier to collect reliable ADC statistics about the signal and to detect malicious interference. This could prevent attacks, for example, that include the transmission of bursts of pulses or retransmission of the whole or part of the original sequence, but at the different transmission power (higher or variable). Such attacks could lead to unusual contents in the accumulator, which could be (potentially) incorrectly interpreted.
- As an alternative to freezing gain settings and/or ADC threshold parameters during the reception of the channel sounding sequence, it is possible to, instead, verify that the gains and thresholds behaved as expected for a sequence that was not attacked, e.g., they didn't change much or they changed by the expected amount.
- Monitoring the correlation strengths (and, optionally, the phase) of each cipher symbol during the accumulation process and setting a requirement on the minimum number of symbols with sufficiently good correlation (e.g., having a strong enough correlation and being within certain phase limits). This is to ensure that (nearly) all cipher symbols correlate consistently and similarly and that the attacker is not damaging only some of the symbols or producing a short lasting burst-type interference.
- Verifying the correctness of data demodulation using channel-matched filters, which may be calculated based on the selected channel estimate. If the system is attacked with random noise and its channel estimate is damaged, there is also a high probability that data payload demodulation will fail as a consequence. The selected channel-matched filter may be based on Ipatov (SYNC) or one of the cipher segments.
- Comparing TOAs as computed based on the Ipatov (SYNC) and the cipher accumulators. They are both estimates of the same channel (but measured using different codes), therefore, they should return very similar results. If the system is attacked, it is extremely unlikely that both the Ipatov sequence and the cipher accumulators would produce false correlation peaks at exactly the same delay.
- Comparing TOAs as computed based on cipher accumulators from different packets, for example, on packets transmitted (or received) one after another (e.g., consecutively, or within a certain time difference).
- Comparing TOAs as computed based on cipher accumulators from two (or more) cipher segments sent during the same packet, for example, consecutive cipher segments.
- Comparing the channel estimate amplitude distribution around the first path region between SYNC/Ipatov sequences and cipher accumulators (or between cipher accumulators obtained from different segments, e.g., where a cipher comprises several segments). While the distributions should be similar (because the channel is assumed to be unchanged during the reception of the whole packet), amplitudes may be scaled, for example, proportionately to sequence lengths and the number of energy pulses collected during accumulation of both the Ipatov and cipher sequences. A function can be designed to calculate the probability that the compared first path regions have the same distribution.

In some embodiments, the function used is a rank sum test (also known as the Wilcoxon rank sum test or the Mann-Whitney U test). It is a non-parametric hypothesis test that can be used to determine whether two independent sets of samples were selected from populations having the same distribution. An example of a rank sum test will now be described. Note that the statistics are not exactly the same between the Wilcoxon rank sum test and the Mann-Whitney U test, but the two have the same efficiency.

Rank sum tests have 95% efficiency of student-tests, but without the requirement of prior information.

The rank sum test contains the following 5 steps:
1. Samples are obtained from each of the two populations A and B containing $n_A$ and $n_B$ samples, respectively. All samples are assumed to be independent from each other.
2. Rank all the samples that were obtained in ascending order from 1 to $(n_A+n_B)$. Tiers (samples which have the same value) have the same rank.
3. Sum all of the ranks for the samples from populations A and B, respectively, and note as $w_A$ and $w_B$.
4. When both $n_A$ and $n_B$ are 10 or greater and $n_A \leq n_B$, we can treat the distribution of $w_A$ as if it were normal ($\mu_A$, $\sigma_A$), where:

$$\mu = \frac{n_A(n_A + n_B + 1)}{2}$$

$$\sigma = \sqrt{\frac{n_A n_B (n_A + n_B + 1)}{12}}$$

If there are tiers, the correction below is used with k being the number of distinct tiers and $t_i$ being the number of samples sharing ranks:

$$\sigma_A = \sqrt{\frac{n_A n_B}{12}\left((n_A + n_B + 1) - \sum_{i=1}^{k}\frac{t_i^3 - t_i}{(n_A + n_B)(n_A + n_B - 1)}\right)}$$

Then:

$$z = \frac{w_A - \mu_A}{\sigma_A} \sim N(0, 1)$$

5. Compare z to the threshold determined by the significant level. If $|z| \leq$ threshold, we accept a null hypothesis that the two populations are from the same distribution, unless the alternative hypothesis is taken.

The proposed double rank sum tests to verify the first path has the following steps:
1. Calculate equivalent Ipatov_first_path=Cipher_ first_path−implementation_specific_offset 2. Samples are taken from the floor (first path estimation) in the Ipatov sequence and the cipher sequence with $n_{fp}=n_{cy}=30$, respectively.
3. Remove the direct current (DC) offset from the samples and then calculate the amplitude of each sample and normalize them by peak amplitude. The DC offset in the cipher sequence is provided by a CIA algorithm. In the Ipatov sequence, the DC offset=median (accumulator (1:((first path−1))).
4. Run the first rank sum test with a threshold of 3, which is equivalent to a significant level of 0.135%. For any statistics where $|z_1|>3$, mark it as a false early first path.

With the assumption that the Ipatov sequence and cipher sequence are passing through the same channel but have different noises, $|z_1|$ should be small enough, unless the first cipher path falls in the noise region rather than the channel window.

However, if the false early first path is small and close to the channel window, the statistics $|z_1|$ would be small as well. In order to detect the false early first path in this case, a 2nd rank sum test is introduced:

5. For packets passing the first rank sum test, run a second rank sum test with the same 30 cipher sequence samples and 25 Ipatov sequence samples that remove the first 5 samples, $n_{fp}=25$ and $n_{cy}=30$. Then we have the 2nd statistics $z_2$.
6. If the absolute difference $|z_1-z_2|<0.58$, calculate the first path and peak path amplitude ratio in the cipher and, if the ratio r<0.25, mark it as an false early first path.

The principle behind points 5 and 6 is that if there is a fake strong first path only in the cipher sequence, it would not pass the first rank sum test. However, if there is a strong real first path in the cipher accumulator, it should be in the Ipatov accumulator as well. Hence, if we remove the first five samples in the Ipatov sequence that definitely contain the first path, the difference $|z_1-z_2|$ would be large enough, unless the first path was weak or non-existent in the Ipatov accumulator, e.g., added by attack.

In summary, the proposed double rank sum tests detect a false early first path by two main means:
1. The first rank sum test catches all the false very early first paths that fall into the noise region and the near but strong false early first paths as well.
2. The weak and close false early first path is caught by the second rank sum test and following the first path to the peak path ratio.

Comparing sample phases in the first path region between the Ipatov or SYNC pattern and the cipher (or between cipher segments). Depending on how transitions between the sequences are handled (Ipatov sync, SFD, cipher and data), the phase may be either fixed throughout the whole packet or certain phase offsets may be added. After subtracting any effects due to transition-related phase changes, the respective phases should be similar. A phase consistency test can verify that the first path regions of the cipher and Ipatov sequences (or consecutive cipher segments) have similar phase differences between subsequent samples.

A second variant is also possible. Rather than verifying that the phases of samples in the first path regions match, it is also possible to verify that phase changes (progression) between consecutive samples match. An example will now be described:

The core idea behind this test is that if the cipher first path is a real first path, the SYNC pattern, or Ipatov preamble, will also contain signal energy in those positions and the phase in the first path region should be similar.

If there is an early false cipher first path, whether due to a side lobe or an attack, the corresponding section in the Ipatov accumulator will contain different noise samples and, hence, the phase should differ.

This approach could have a number of advantages:

By comparing the phase in the first path region, the actual shape of the first paths are compared, rather than just the distribution of the samples.

By comparing the phase rather than amplitudes, the need for normalization due to different accumulation lengths is avoided.

Unlike in PDOA applications, the absolute phase is not important. Errors due to phase advance and ambiguity functions could be avoided by working with the relative phase progressions rather than the absolute phases.

A number of variations can be considered:

Selection of first path samples:
- in the cipher accumulator, a window of four samples is considered, starting from the sample before the first path position; and
- in the SYNC pattern or Ipatov accumulator, the corresponding window of four samples is taken, based on the fact that there is a fixed offset between the Ipatov and cipher accumulator first paths.

Convert to phase progressions:
- calculate the four phases in each set of samples (in the following, it is assumed that the phase is expressed in degrees); and
- convert to three phase progressions (diff(angles) in Matlab).

Consider the difference between the two phase progressions:
- take the difference between the two phase progressions;
- convert them to an angle between −180 and 180 degrees; and
- two of the three phase differences have to be within 5 degrees.

Applying machine learning based classification algorithms to assess the integrity of the first path estimation, e.g., using a machine learning logistic regression-based assessment of the cipher-based TOA. Machine learning based classification algorithms learn the probabilities of integrity and shapes of correct and erroneous first path estimates from training datasets that can contain data from simulation or real measurements from different use cases. When the learning phase is completed, the experiences and patterns that the algorithms learned are applied to the measured accumulators to predict integrity of the first path estimations. Machine learning logistic regression based classification can be configured to learn how to classify an early first path from a training data set by modeling the output, e.g., by following a binary Bernoulli distribution. An example will now be described.

If we categorize an early first path as '1' and a correct first path as '0,' the early first path detection becomes a binary classification problem. In machine learning, many classification algorithms have been proposed in the past years. Given the requirements of low computational complexity, fast processing time, and labelled training data (we know which estimations are early first paths and which are not), logistics regression is a good candidate to start from.

Logistic regression is a statistics-based classification algorithm. A logistic model is one where the log-odds of the probability of an event is a linear combination of independent or predictor variables. In logistic regression, we assume that output follows a binary Bernoulli distribution with the probability:

TABLE 1

Probability in logistic regression

| y | 0 | 1 |
|---|---|---|
| Probability | $1 - p = \dfrac{e^{-\theta^T x}}{1 + e^{-\theta^T x}}$ | $p = \dfrac{1}{1 + e^{-\theta^T x}}$ | where $x=(X_1, X_2, \ldots, X_n)$ is an input feature vector, $\theta=(\theta_1, \theta_2, \ldots, \theta_n)$ is the parameter or coefficient vector, and y are known labels in training data, then the likelihood function is:

$$L(\theta \mid x) = Pr(Y \mid (X; \theta)) = \prod_i h_\theta(x_i)^{y_i}(1 - h_\theta(x_i))^{(1-y_i)}$$

where $h_\theta(X_i)=1/1+e^{-\theta^T x}$, the cost function in logistic regression is $-\log(L(\theta|x))$ is:

$$-\log(L(\theta \mid x)) = -\sum_i y_i \log(h_\theta(x_i)) + (1 - y_i)\log((1 - h_\theta(x_i)))$$

Logistic regression uses optimization techniques to obtain a parameter vector $\hat{\theta}$ that minimizes a cost function based on paired training data sets (x, y).

With the coefficient vector $\hat{\theta}=(\hat{\theta}_1, \hat{\theta}_2, \ldots, \hat{\theta}_n)$, we could predict the probabilities of y being '0' and '1' for new data by using Tabl. After comparing with a pre-defined threshold, y could be classified as '1' if the probability is larger than a threshold, or '0' for other cases.

When using logistic regression in early path detection, the input feature vector x can be sampled around first path estimation in a cipher accumulator and the threshold can be set according to the missing and false early first path detection requirements.

Meanwhile, a probability of an early first path would be much smaller than of a correct first path. The training process will tend to bias towards a dominant class, even if we adjust the threshold. The dominant class is the class that most of the samples belong to. For instance, a real first path is the dominant class as the number of its samples are much larger than false early first path. To mitigate the effect of imbalanced data, we give different weights for different classes in the cost function to make the cost of instances in class '1' higher than in class '0'. The cost function becomes:

$$-\log(L(\theta \mid x)) = -\sum_i w_i(y_i \log(h_\theta(x_i)) + (1 - y_i)\log((1 - h_\theta(x_i))))$$

where $w_i$ is the cost for each instance and its value is:

$$w_i = \begin{cases} \dfrac{1}{\text{frequency of class '1'}} & \text{if instance } i \in \text{class '1'} \\ \dfrac{1}{\text{frequency of class '0'}} & \text{if instance } i \in \text{class '0'} \end{cases}$$

For coefficient vector $\hat{\theta}$ estimation, we need to train a logistic regression classifier using training data. The classification error in training sets is called a training error. In order to test the performance of the logistic regression classifier, a disjoint data set should be used as a testing data set. Similarly, a classification error in the testing set is called a testing error. The testing error is also known generalization error as a measurement of ability to predict unseen data.

We use training error to tune feature length and thresholds. The performance of the logistic regression classifier is evaluated on a test data set.

Analyzing the correlator output (sum of correlated bits) at each delay as it gets accumulated over time. Analysis may be done on both real and imaginary axes. The property of the genuine weak first path is that it will produce weak correlation output in each correlated symbol, resulting in slow but steady accumulator growth at the particular delay. A sidelobe, mimicking weak path (for example introduced by the attacker's malicious transmissions), would result in very noisy and random correlator output, sometimes positive, sometimes negative. Accumulator growth at this delay will therefore be chaotic: sometimes growing in the right direction, sometime strongly backtracking in the other.

Therefore monitoring of the growth pattern of the accumulated sample will provide a criteria for distinguishing between genuine slowly growing first path and chaotic growth of the false path (e.g. of a sidelobe).

Figure 8:
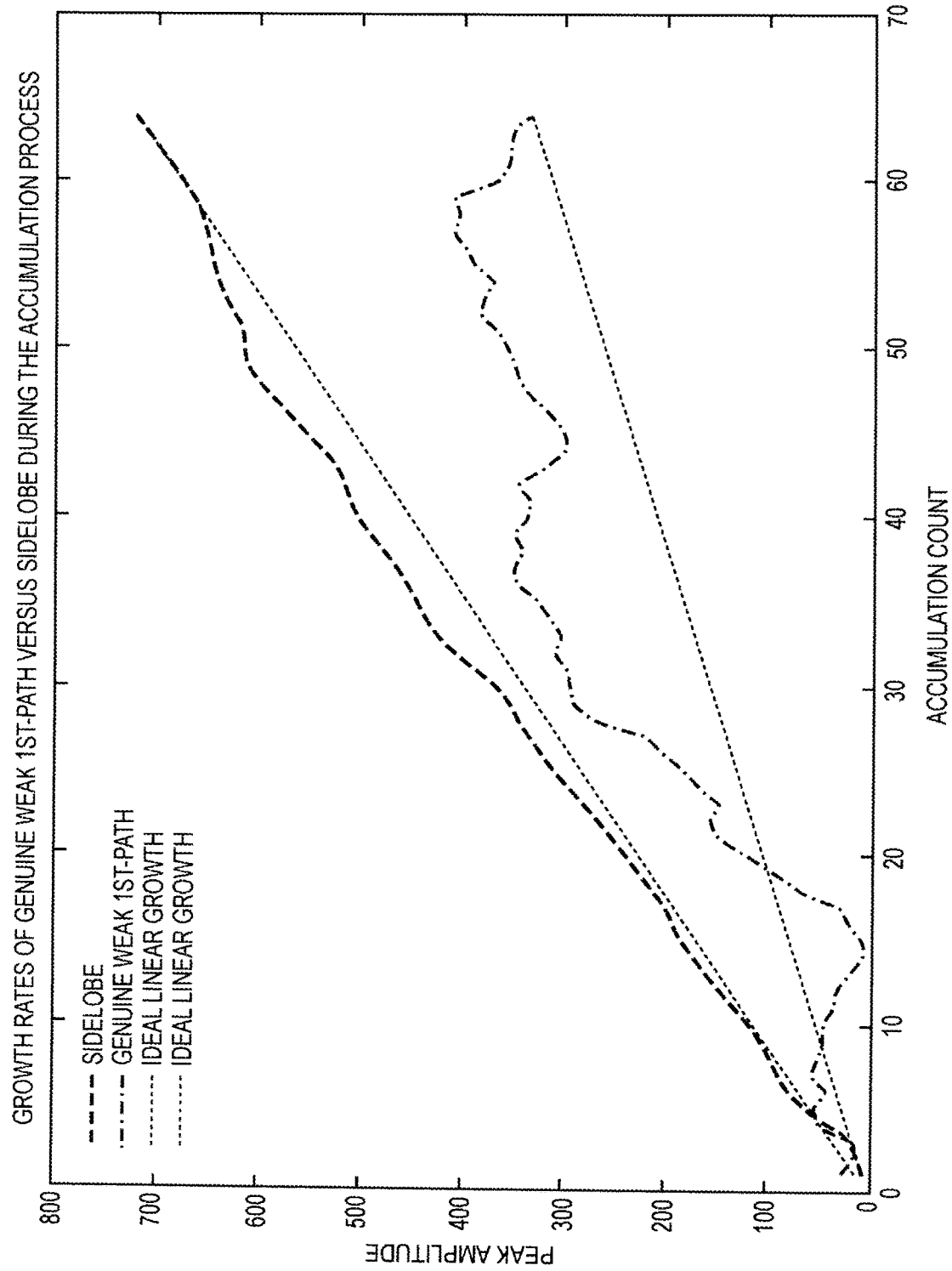
FIG. 8 shows an example growth rate of the genuine versus false paths in an accumulator.
Figure 9:
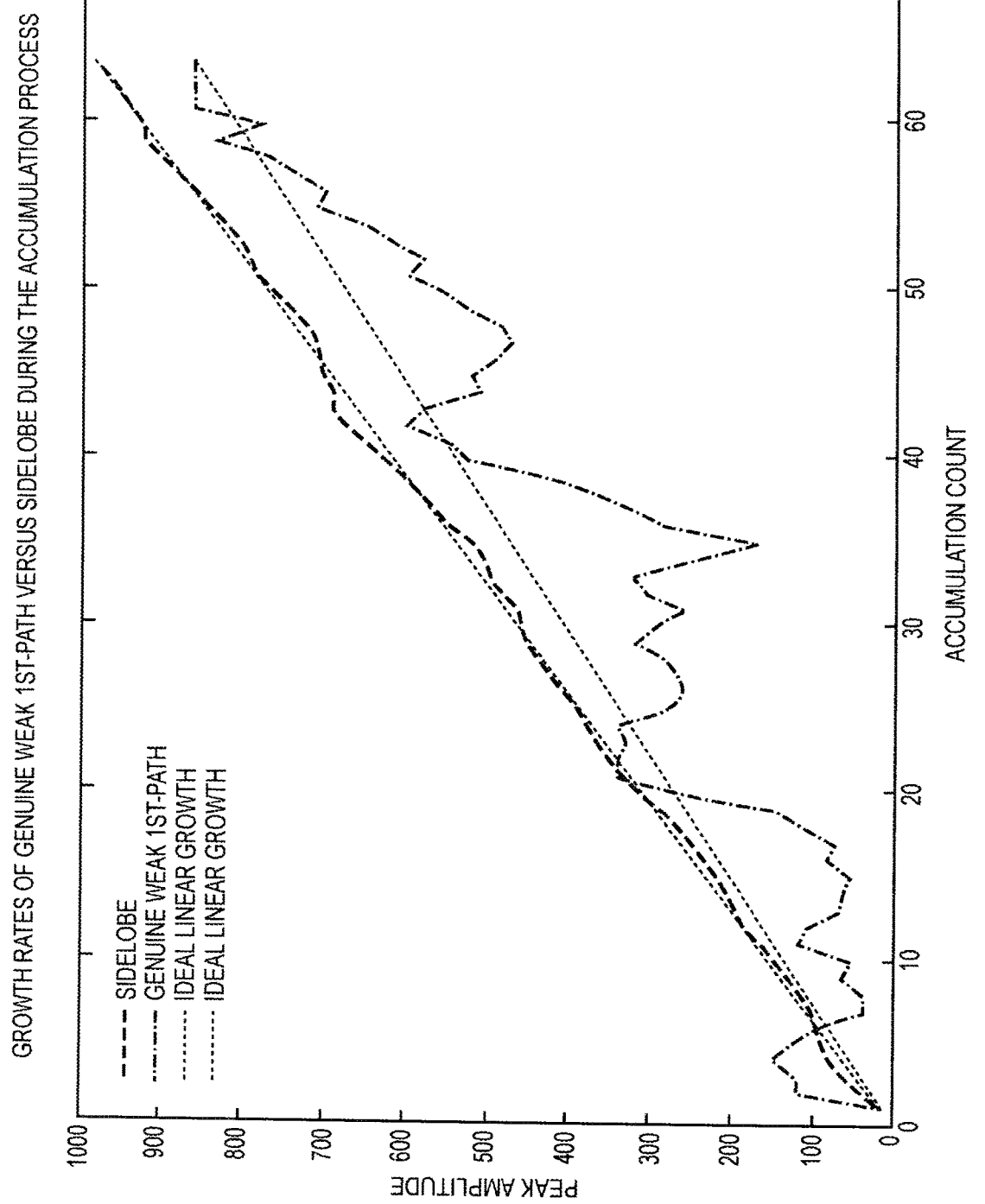
FIG. 9 shows another example growth rate of the genuine versus false paths in an accumulator.

Example patterns have been presented in FIG. 8 and FIG. 9. The algorithm may, for example, compute how far the growth function diverges from the ideal linear growth and then implement a threshold for acceptance the path based on this criteria.

FIG. 8 and FIG. 9 show example growth rates of the genuine versus false paths.

The attacker could record and retransmit the genuine signal pulses at a high power with a variable retransmission delay. This would introduce an additional strong path which would appear like a strong reflection. The timing recover algorithm may lock onto the strongest energy in a certain selected window and then try to maintain the lock to the strongest signal. If the retransmitted path had a variable delay, it could manipulate the timing recovery algorithm to compensate for the changing delay, thus shifting the whole correlation window and shortening the apparent distance of the genuine paths. There are several ways it would be possible to counteract this:

In the case where the carrier and the baseband (modulation) clocks are synchronized (in the transmitter), it is possible, in the receiver, to calculate timing recovery adjustments as a function of the CFO, since these two are closely synchronized. Usually, a scaling factor is needed to calculate the timing offset adjustment based on the CFO.

Alternatively (and also in cases where the transmitter, carrier, and baseband clocks were not synchronized), it would be possible to limit the maximum timing shift that the timing recovery algorithm is allowed to apply during the packet reception. Considering the packet's short duration and maximum allowed clock difference tolerance, the maximum timing offset during the packet is limited and can be calculated. If the attacker artificially shifts the path timing offset by more than that value, the receiver will only be able to follow that shift within specified limits, thus preventing significant change to the first path position.

The attacker could also attack the ranging protocol. In single-sided, two-way ranging, it is necessary to compensate for the clock differences between the two sides. This is due to the fact that the response delay will be clocked at different rates if the transmitter and receiver clocks differ. A compensation typically involves subtracting the compensation factor, which depends on both the response delay duration and the clock difference CFO. If the attacker retransmits the original response message, but at slightly changed rate, the receiver will estimate the wrong CFO and perform incorrect compensation, which could result in a shortening of the distance. To prevent this, the two CFO estimates (CFO1 and CFO2) that were calculated on both sides during the reception of the two ranging packets should be compared. If CFO1 is not close to −CFO2, it could indicate some kind of carrier clock manipulation, in which case the distance measurement could be rejected by the host processor. The measured CFO1 and CFO2 can be transmitted in the data payload or through other protocols. For example, it may be necessary to check that CFO1 and −CFO2 are within 1 ppm of each other, e.g., abs(CFO1+CFO2)=<1 ppm.

CFOs are generally in the range of −40 ppm to +40 ppm.

Figure 10:
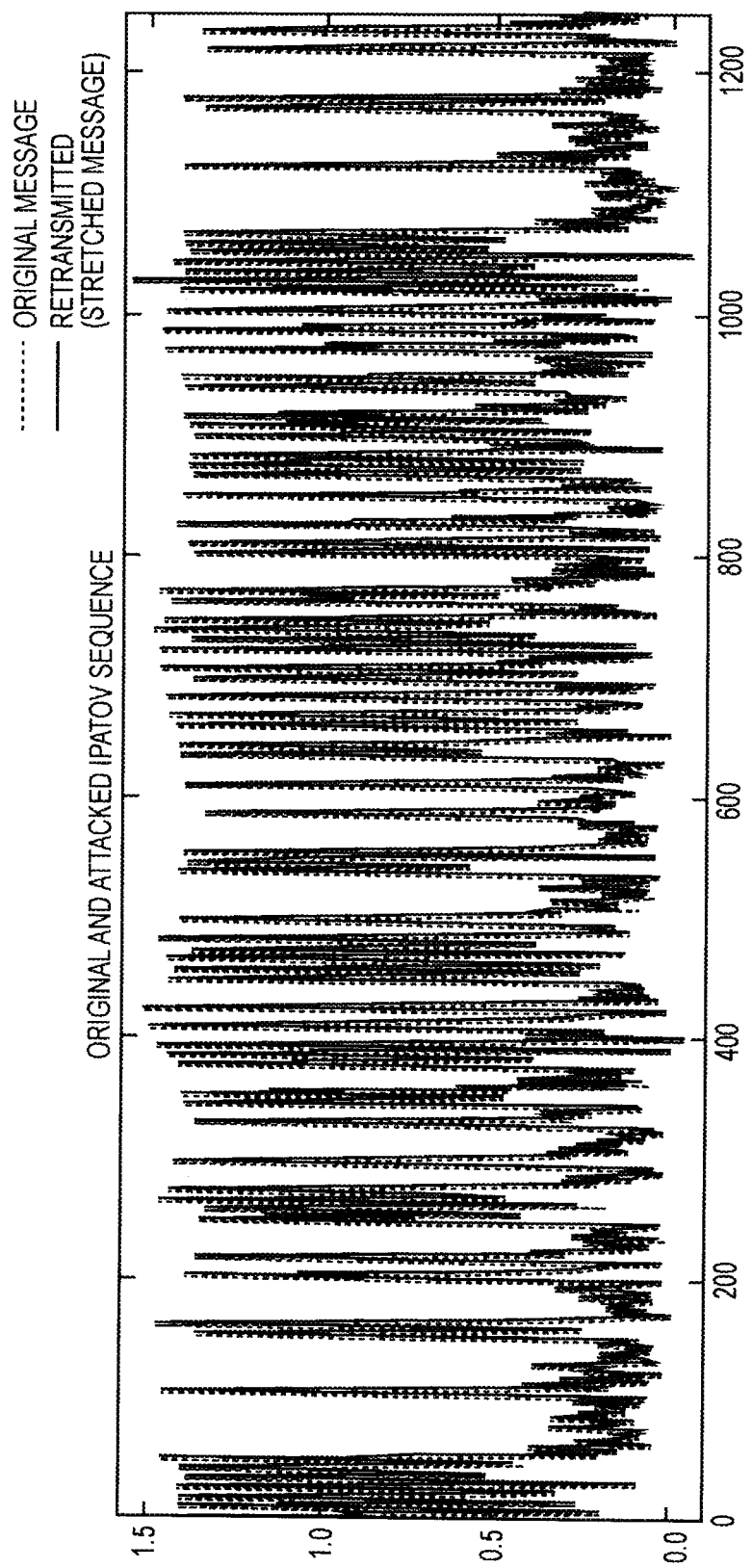
FIG. 10 shows original and retransmitted sequences in an exemplary attack.
Figure 11:
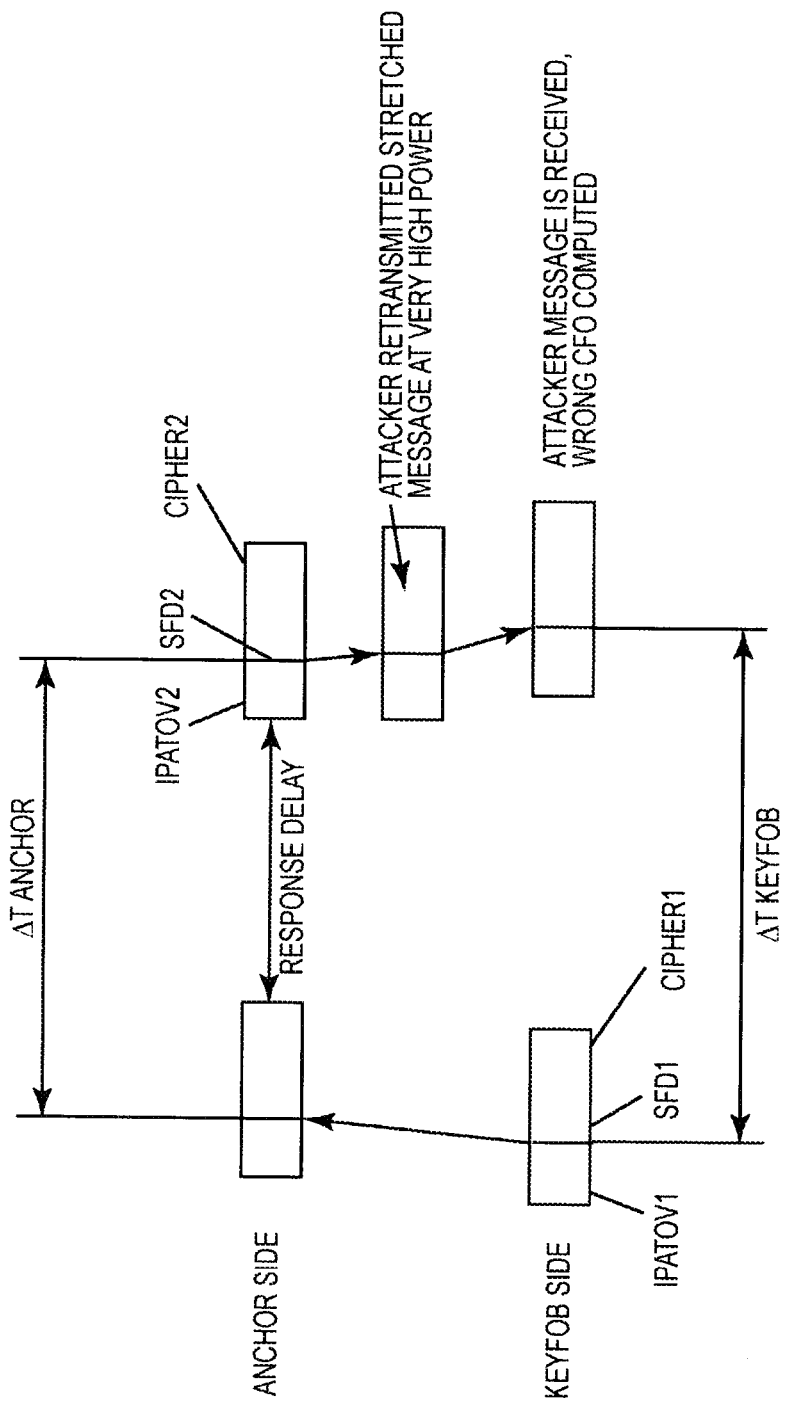
FIG. 11 shows a block diagram of an attack on a keyfob and anchor system.

An example of such an attack is illustrated in FIG. 10 and FIG. 11. The attacker retransmits the original message consisting of a series of pulses, but at slightly lower rate, resulting in the message being stretched, as shown in FIG. 10.

In FIG. 11 below, the initiator (in this case, the keyfob) receives a modified response message from the responder (anchor) and computes an incorrect CFO2. It appears to the keyfob that the anchor's clock is slower. The keyfob predicts that the anticipated response should arrive later, because the anchor clocked the response delay at a slower rate than the keyfob. The keyfob therefore calculates the distance (using the incorrect CFO2) and subtracts the wrong time offset (translating into the distance offset), which would result in the keyfob estimating a lower distance.

To prevent this kind of attack, it is possible to compare CFO1 estimated by the anchor and CFO2 estimated by the keyfob. In normal circumstances, CFO1 should be close to −CFO2. For example, the criteria may be that abs(CFO1−CFO2) is less than 1 ppm, but in other embodiments, the criteria may be that abs(CFO1−CFO2) is less 2 ppm or less than 3 ppm. The attack on the CFO would only provide meaningful distance reduction if the corrupt CFO was >20-40 ppm.

The precursor area in the accumulator (that is, the area before the first path), in normal circumstances, is noisy and noise should typically have a normal or Gaussian-like distribution. A receiver could perform an analysis of the actual distribution of the precursor samples. This analysis could, for example, use the mean noise value (MNV) and check how many precursor samples are above 2*MNV, 3*MNV, 5*MNV, 7*MNV, etc. In many types of malicious attacks, the noise in the precursor area will have unusual distributions, for example, there can be more samples having quite high amplitude compared to the mean noise (spikes). The verification would involve checking if proportions of low noise samples and high noise sample are as expected for the typical Gaussian-like noise distribution. An example attack could be where a malicious transmitter transmits high-power random pulses during or just after the preamble. This would result in the receiver gain adapting to it and ADC thresholds increasing. As a consequence, there would be no noise getting through the ADC. As a result, the accumulator would be very clean, without the usual background noise, but could contain some 'spikes'. This verification method would help identify cases where an unusually high number of high 'spikes' are present and could also possibly result in a rejected ranging measurement.

While a specific architecture is shown, any appropriate hardware/software architecture may be employed. For example, external communication may be via a wired network connection.

The above embodiments and examples are to be understood as illustrative examples. Further embodiments, aspects, or examples are envisaged. It is to be understood that any feature described in relation to any one embodiment, aspect, or example may be used alone, or in combination with other features described, and may also be used in combination with one or more features of any other of the embodiments, aspects, or examples, or any combination of any other of the embodiments, aspects, or examples. Furthermore, equivalents and modifications not described above may also be employed without departing from the scope of the invention, which is defined in the accompanying claims.

What is claimed is:

1. An Ultra-Wide Band (UWB) wireless communication receiver configured to:
   receive, from a transmitter, data comprising a plurality of channel-distorted cipher codes;
   generate a receiver cipher sequence, the receiver cipher sequence comprising a plurality of receiver cipher codes;
   analyze the received data to identify correlations between the plurality of channel-distorted cipher codes in the received data and the plurality of receiver cipher codes;
   accumulate the identified correlations as accumulator data in an accumulator;
   identifying one or more peaks in the accumulator data;
   identify a first correlation peak in the accumulator data that meets one or more criteria;
   computing a threshold value based on one or more of:
      a length of the receiver cipher sequence;
      a pulse repetition frequency, PRF, of the receiver cipher sequence;
      transmission power used;
      a configuration of one or more sidelobe minimization receiver algorithms;
      a required security level; and
      static configuration of a receiver gain;
   use the first correlation peak to identify a first path of a data packet from the transmitter; and
   wherein the identifying of the first correlation peak in the accumulator data that meets the one or more criteria comprises:
      comparing the one or more peaks to the threshold value to identify the first correlation peak that exceeds the threshold value.

2. The UWB receiver of claim 1, further configured to:
   apply one or more countermeasure checks to the identified first correlation peak in the accumulator data that meets the one or more criteria; and
   reject the identified first path and/or reject the data packet if the one or more countermeasure checks are not passed.

3. The UWB receiver of claim 1, further configured to:
   measure one or more parameters; and
   compute the threshold value based on the one or more measured parameters.

4. The UWB receiver of claim 3, wherein the one or more parameters are selected from:
   average noise level in the accumulator;
   amplitude of a highest peak or peaks in the accumulator data before an expected first path;
   strength of multipath reflections and a multipath profile;
   carrier frequency offset, CFO;
   dynamic behavior of automatic gain control, AGC, applied at the UWB receiver;
   configuration of an analog-to-digital converter (ADC).

5. The UWB receiver of claim 4, wherein the configuration of the ADC includes converged ADC threshold values.

6. The UWB receiver of claim 1, wherein computing the threshold value comprises setting the threshold value to at least a predetermined minimum threshold value.

7. The UWB receiver of claim 1, wherein the received data further comprises channel-distorted synchronization codes, a start of frame delimiter and/or payload data; and wherein the UWB receiver is configured to identify the first correlation peak in the accumulator data that meets one or more criteria by:
   recording one or more analog-to-digital output statistics during reception of the channel-distorted cipher codes;
   recording one or more analog-to-digital output statistics during reception of at least one of the synchronization codes, the start of frame delimiter and the payload data; and
   wherein the UWB receiver is configured to identify the first correlation peak in the accumulator data that meets one or more criteria by:
   determining that the value(s) of the one or more statistics during reception of the channel-distorted cipher codes does not differ from the value(s) of the statistics during reception of at least one of the synchronization codes, the start of frame delimiter and the payload data by more than a predetermined difference value.

8. The UWB receiver of claim 1, wherein the received data further comprises channel-distorted synchronization codes, a start of frame delimiter and/or payload data; and wherein the UWB receiver is configured to identify the first correlation peak in the accumulator data that meets one or more criteria by:
   recording a first set of one or more analog-to-digital output statistics during reception of the channel-distorted cipher codes; and
   recording a second set of one or more analog-to-digital output statistics during reception of at least one of the synchronization codes, the start of frame delimiter and the payload data; and
   wherein identifying a first correlation peak in the accumulator data that meets one or more criteria comprises:
   determining a change in the PRF between the cipher codes and the at least one of the synchronization codes, the start of frame delimiter and the payload data;
   scaling the first set of analog-to-digital output statistics based on the determined change;
   determining that the scaled value(s) of the first set do not differ from the value(s) of the second set by more than a predetermined difference value; or scaling the second set of analog-to-digital output statistics based on the determined change; and
   determining that the scaled value(s) of the second set do not differ from the value(s) of the first set by more than a predetermined difference value.

9. The UWB receiver of claim 7, wherein the one or more analog-to-digital output statistics are indicative of the energy level of an analog-to-digital converter.

10. The UWB receiver of claim 9, wherein the energy level of the analog-to-digital converter is the rate of energy per unit time.

11. The UWB receiver of claim 1, wherein the receiver cipher sequence comprises a plurality of cipher symbols, and wherein the UWB receiver is configured to analyze the received data by:

identifying the correlation strength of each of the plurality of cipher symbols in the receiver cipher sequence with the plurality of channel-distorted cipher codes in the received data; and counting a number of symbols having a correlation strength above a specified minimum correlation strength threshold; and wherein the one or more criteria comprises:

a proportion of the symbols in the receiver cipher sequence having a correlation strength above a correlation strength threshold being above a predetermined symbol correlation proportion threshold.

12. The UWB receiver of claim 1, wherein the receiver cipher sequence comprises a plurality of cipher symbols, and wherein the UWB receiver is configured to analyze the received data by:

identifying correlation strength and phases of each of the plurality of cipher symbols in the receiver cipher sequence with the plurality of channel-distorted cipher codes in the received data; and counting a number of symbols having a correlation strength above a specified minimum correlation strength threshold and also being within a phase limit; and wherein the one or more criteria comprises:

the proportion of the symbols in the receiver cipher sequence having a correlation strength above a correlation strength threshold and also being within a phase limit being above a predetermined symbol correlation proportion threshold.

13. The UWB receiver of claim 1, wherein the one or more criteria is based on monitoring an accumulator growth rate over time.

14. The UWB receiver of claim 13, wherein the accumulator growth rate over time is the growth rate of the first correlation peak or at an expected location of the first path peak in the accumulator data.

15. The UWB receiver of claim 13, configured to monitor the accumulator growth rate over time by:

computing a linear growth function based on the accumulator data; and comparing the accumulator growth rate over time with the linear growth function; and wherein one of the one or more criteria comprises the accumulator growth rate diverging from the linear growth function by less than a predetermined growth rate divergence threshold.

16. The UWB receiver of claim 1, further configured to use the first path to calculate time of flight and/or distance between the transmitter and the UWB receiver.

17. The UWB receiver of claim 1, further configured to:

accumulate correlations in received channel-distorted synchronization data in a synchronization accumulator;

calculate a first time of flight between the transmitter and the UWB receiver based on a first correlation peak in the synchronization accumulator;

calculate a second time of flight between the transmitter and receiver based on a first correlation peak in the accumulator data; and wherein calculation of the second time of flight comprises:

accepting the second time of flight only if the calculated first time of flight differs from the calculated second time of flight by less than a predetermined time of flight difference threshold.

18. The UWB receiver of claim 1, wherein the channel-distorted cipher codes in the received data correspond to at least a first data packet and a second data packet, and wherein the UWB receiver is further configured to:

calculate a first time of flight between the transmitter and the UWB receiver based on the first correlation peak in cipher accumulator data that meets the one or more criteria in the first data packet;

calculate a second time of flight between the transmitter and the UWB receiver based on the first correlation peak in the cipher accumulator data that meets the one or more criteria in the second data packet;

determine a difference between the calculated first time of flight and the calculated second time of flight; and accept one of the first time of flight or the second time of flight as identifying the first path of a data packet from the transmitter to the UWB receiver only if the calculated first time of flight and the calculated second time of flight differ by less than a predetermined time of flight difference threshold.

19. The UWB receiver of claim 1, configured to identify that a correlation peak in the accumulator data meets one or more criteria by:

determining the distribution of the accumulator data in the accumulator prior the correlation peak; and identifying the correlation peak meets one of the one or more criteria if the distribution of the accumulator data in the accumulator has a normal distribution.

20. The UWB receiver of claim 19, configured to determine the distribution of the accumulator data by:

calculating a mean noise value (MNV) of the accumulator data prior to the correlation peak; and determining a proportion of accumulator samples in the accumulator data prior to the correlation peak that exceed a threshold multiple of the MNV; and wherein the criteria is based on the proportion of accumulator samples that exceed the threshold multiple of the MNV.

21. The UWB receiver of claim 1, further configured to:

calculate a first time of flight between the transmitter and the UWB receiver based on a first correlation peak of a first segment in ciphered accumulator data that meets the one or more criteria; and calculate a second time of flight between the transmitter and the UWB receiver based on a first correlation peak of a second segment in the ciphered accumulator data that meets the one or more criteria; and accept one of the first time of flight and the second time of flight as identifying the first path of a data packet from the transmitter to the UWB receiver only if the calculated first time of flight and the calculated second time of flight differ by less than a predetermined time of flight difference threshold.

22. The UWB receiver of claim 21, wherein the first and second segments are associated with the same data packet.

23. The UWB receiver of claim 1, wherein identified correlations are accumulated in a plurality of accumulators and wherein the UWB receiver is further configured to:

identify a plurality of first correlation peaks that meet the one or more criteria, each identified first correlation peak corresponding to one of the plurality of accumulators; and compare a distribution of the accumulator data around each of the identified first correlation peaks; and use the identified plurality of first correlation peaks to identify the first path of a data packet from the transmitter only if the distribution of the accumulator data around each of the identified first correlation peaks is sufficiently similar.

24. The UWB receiver of claim 23, further configured to determine if the distribution of the accumulator data around each of the identified first correlation peaks is sufficiently similar by calculating a measure of the distribution similarity and determine the distribution similarity is within a similarity threshold.

25. The UWB receiver of claim 23, further configured to, prior to determining if the distribution of the accumulator data around each of the identified first correlation peaks is sufficiently similar:
normalize the data around each of the identified first correlation peaks based on one or more of:
an amplitude of the corresponding correlation peak;
a length of a corresponding sequence; and
a number of energy pulses detected during accumulation of the corresponding sequence.

26. The UWB receiver of claim 25, wherein the corresponding sequence is a cipher segment or a synchronization sequence.

27. The UWB receiver of claim 1, wherein the received data further comprises a plurality of channel-distorted synchronization codes, and the UWB receiver is further configured to develop a synchronization-based channel estimate from the received data packet based on the plurality of channel-distorted synchronization codes.

28. The UWB receiver of claim 1, further configured to develop a channel estimate from the received data packet based on the plurality of channel-distorted cipher codes.

29. The UWB receiver of claim 1, configured to identify a first correlation peak in the accumulator data that meets one or more criteria by:
selecting a channel-matched filter based on a channel estimate;
demodulating the received data using the channel-matched filter; and
identifying one of the one or more criteria is met if the demodulated data is correct.

30. The UWB receiver of claim 1, wherein identified correlations are accumulated in a plurality of accumulators and the UWB receiver is further configured to:
identify a plurality of first correlation peaks that meet the one or more criteria, each identified first correlation peak corresponding to one of the plurality of accumulators;
compare the phase of channel estimate data at each of the identified first correlation peaks; and
use the identified plurality of first correlation peaks to identify the first path of a data packet from the transmitter only if the phase of the accumulator data at each of the identified first correlation peaks is within a phase difference threshold.

31. The UWB receiver of claim 1, wherein identified correlations are accumulated in a plurality of accumulators and the UWB receiver is further configured to:
identify a plurality of first correlation peaks that meet the one or more criteria, each identified first correlation peak corresponding to one of the plurality of accumulators;
comparing a phase of channel estimate data at each of the identified first correlation peaks; and
use the identified plurality of first correlation peaks to identify the first path of a data packet from the transmitter only if the phase of the accumulator data at each of the identified first correlation peaks is the same or differs by a predetermined phase offset within a phase difference threshold.

32. The UWB receiver of claim 1, wherein the one or more criteria are based on a classification that was learned from a training data set.

33. The UWB receiver of claim 1, further configured to convert the received data from analog to digital using an analog-to-digital converter having resolution restricted to five or fewer levels.

34. The UWB receiver of claim 1, further configured to convert the received data from analog to digital using an analog-to-digital converter having resolution restricted to three or fewer levels.

35. The UWB receiver of claim 1, wherein the received data comprises channel-distorted synchronization codes received prior to receipt of the plurality of channel-distorted cipher codes; wherein the UWB receiver is further configured to:
select gain and/or analog-to-digital converter parameter(s) based on the channel-distorted synchronization codes;
maintain the selected gain and/or analog-to-digital converter parameter(s) during receipt of the plurality of channel-distorted cipher codes.

36. The UWB receiver of claim 1, wherein the received data comprises channel-distorted synchronization codes, a start of frame delimiter and/or payload data; wherein the UWB receiver is further configured to:
read a first set of gain and/or analog-to-digital converter parameter(s) based on the channel-distorted synchronization codes, start of frame delimiter and/or payload data;
read a second set of gain and/or analog-to-digital converter parameter(s) based on the received plurality of channel-distorted cipher codes;
determine differences between the first set of gain and/or analog-to-digital converter parameter(s) and the second set of gain and/or analog-to-digital converter parameter(s); and
use the first correlation peak to identify the first path only if the determined differences do not exceed a predetermined parameter threshold for each of the parameter(s).

37. The UWB receiver of claim 1, further configured to estimate the carrier frequency offset (CFO) based on the received data;
calculate the timing offset of the received data to compensate for offset between a clock of the UWB receiver and a clock of the transmitter, wherein the adjustment of the receiving time is based on the estimated CFO and the timing adjustment is limited to a predetermined maximum adjustment; and
adjust the timing offset of the received data by no more than the calculated adjustment.

38. The UWB receiver of claim 37, wherein the timing adjustment is based on a predetermined packet duration and/or maximum allowed clock frequency offset (CFO).

39. The UWB receiver of claim 1, further configured to:
estimate a first carrier frequency offset estimate associated with the received data;
receive a second carrier frequency offset estimate calculated by the transmitter; and
compare the first carrier frequency offset estimate and the second carrier frequency offset estimate;
wherein one of the one or more criteria is met if the first carrier frequency offset estimate differs from a negative of the second carrier frequency offset estimate by less than a frequency offset difference threshold.

* * * * *